(12) United States Patent
Tachihara et al.

(10) Patent No.: US 6,617,067 B1
(45) Date of Patent: Sep. 9, 2003

(54) FUEL EVAPORATOR

(75) Inventors: Takahiro Tachihara, Saitama (JP); Naoyuki Abe, Saitama (JP); Yuuji Asano, Saitama (JP); Kiyoshi Kasahara, Saitama (JP); Shiyuuichi Togasawa, Saitama (JP); Masahito Nakamura, Saitama (JP); Kouji Miyano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/704,802

(22) Filed: Nov. 3, 2000

(30) Foreign Application Priority Data

| Nov. 5, 1999 | (JP) | 11-315996 |
| Nov. 5, 1999 | (JP) | 11-315997 |
| Nov. 5, 1999 | (JP) | 11-315998 |
| Nov. 5, 1999 | (JP) | 11-315999 |
| Nov. 5, 1999 | (JP) | 11-316000 |

(51) Int. Cl.$^7$ .......................... H01M 8/18; F02M 31/00
(52) U.S. Cl. ........................ 429/20; 429/26; 429/12; 261/157
(58) Field of Search ............. 429/26, 17, 13, 429/120, 20; 261/127, 138, 150, 157, 159, DIG. 82

(56) References Cited

U.S. PATENT DOCUMENTS 4,588,659 A * 5/1986 Abens et al. ............... 429/20

FOREIGN PATENT DOCUMENTS

JP  2000-319002  11/2000

* cited by examiner

Primary Examiner—Stephen Kalafut
Assistant Examiner—Raymond Alejandro
(74) Attorney, Agent, or Firm—Arent Fox Kintner Plotkin & Kahn, PLLC

(57) ABSTRACT

In a fuel evaporator provided with an evaporation chamber 11 that produces raw fuel gas FG by vaporizing raw fuel liquid by heat received from a plurality of heat medium tubes 12 through which a high temperature heat medium passes, a raw fuel injection portion that injects raw fuel liquid onto the heat medium tubes 12 is situated in the evaporation chamber 11. The heat medium tubes 12 are arranged sparsely near the raw fuel injection portion and densely away from it. A catalytic combustor 20 is provided adjacent to the bottom surface 11b of the evaporation chamber 11 to form the high temperature heat medium. Such a fuel evaporator efficiently vaporizes raw fuel liquid and can be suitably applied in a fuel cell system for a fuel cell-powered automobile.

18 Claims, 23 Drawing Sheets

FIG.5
(a)
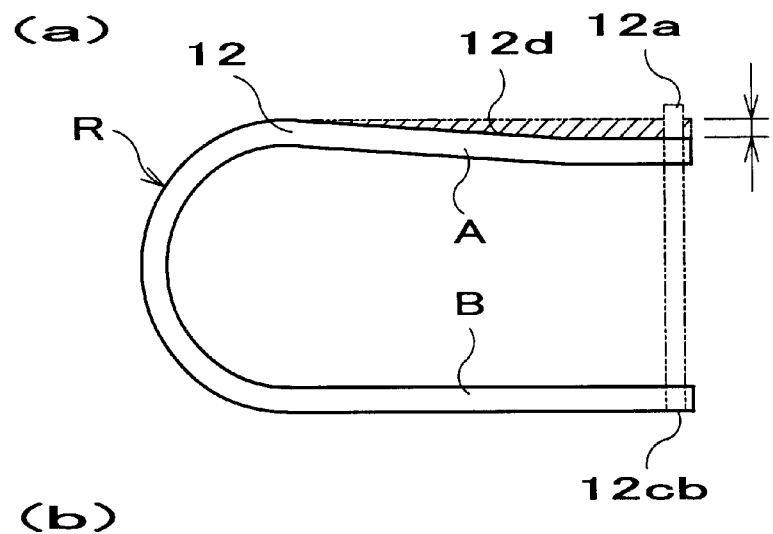
(b)
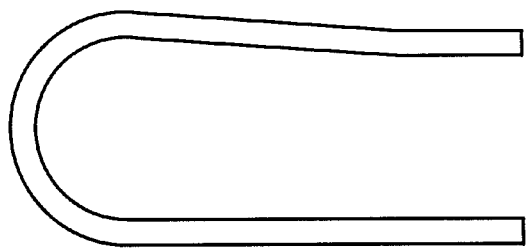
(c)
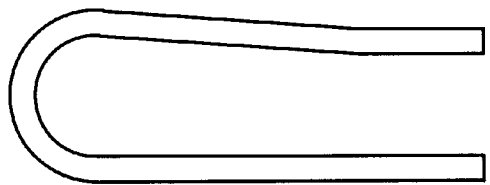
(d)
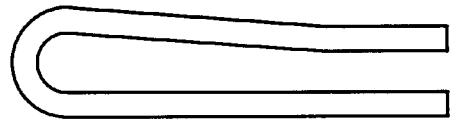

FIG. 14
(a)
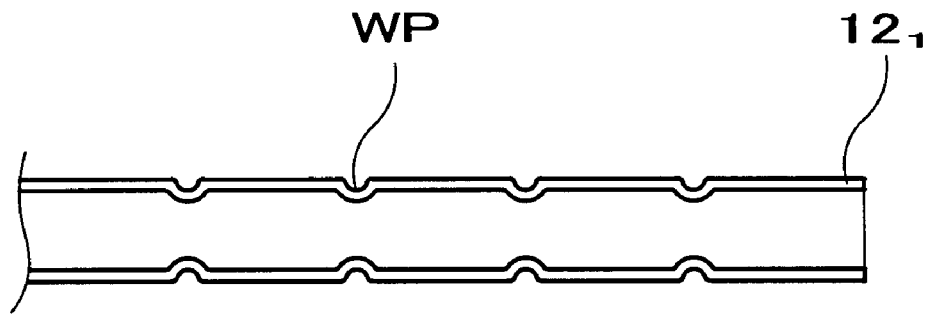
(b)
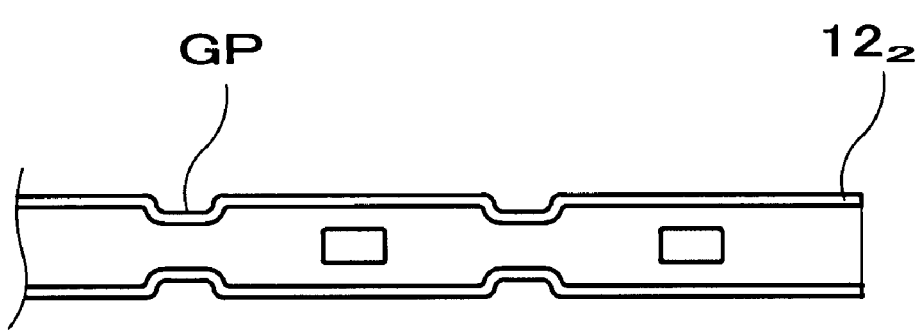

FIG.16
(a)
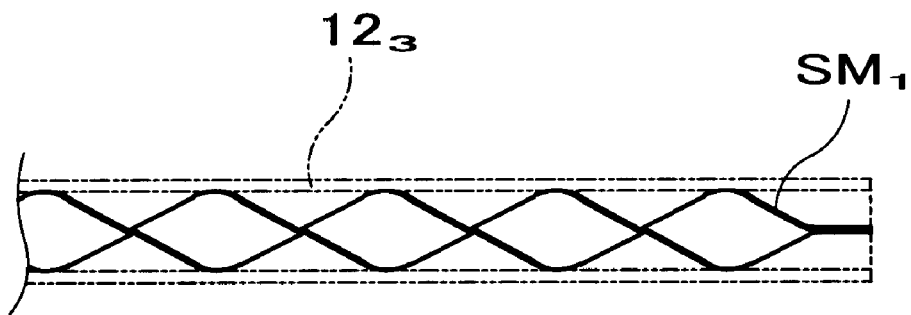
(b)
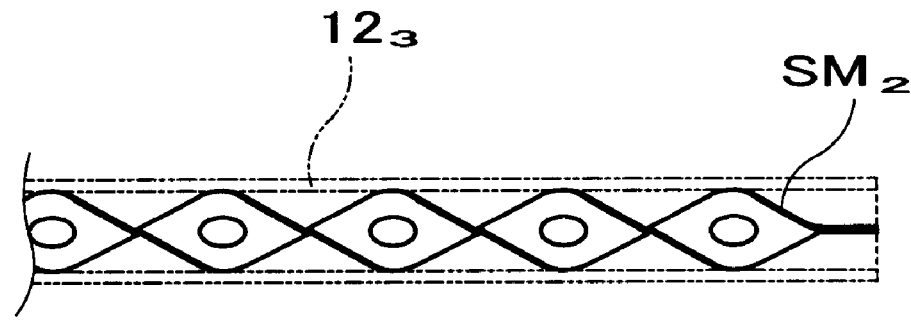

FUEL EVAPORATOR

FIELD OF THE INVENTION

The present invention relates to a fuel cell system that generates electricity by reforming raw fuel gas which is vaporized raw fuel liquid and feeding it to a fuel cell, as well as to a fuel evaporator that can be suitably applied to the fuel cell system.

BACKGROUND OF THE INVENTION

Conventional fuel cell systems are known that inject raw fuel liquid comprising a mixture of methanol and water or the like into a fuel evaporator (evaporation chamber) via a raw fuel injection apparatus and vaporize the raw fuel liquid into raw fuel gas, and then reform the raw fuel gas with a reformer while removing the carbon monoxide to yield hydrogen-rich raw fuel gas and feeding the raw fuel gas to a fuel cell to generate electricity. However, when a fuel cell system having such a construction is used under conditions with extreme load fluctuation, such as when it is mounted for use in a fuel cell-powered electric automobile, sudden injection of the raw fuel liquid into the fuel evaporator based on the requirement for increased output makes it impossible to vaporize all of the raw fuel liquid, and this often creates liquid pools of raw fuel liquid (hereunder referred to as "liquid pools") in the fuel evaporator. When the fuel evaporator has not been adequately warmed up upon starting the fuel cell system, liquid pools tend to form due to a lack of heat for vaporization.

When liquid pools form in the fuel evaporator, the liquid pools vaporize due to heat retained inside even after terminating injection of the raw fuel liquid, and this produces raw fuel gas resulting in undesirable deterioration in the fuel evaporator response.

When the raw fuel liquid is a mixture, the highly volatile components of the formed liquid pools vaporize first thus creating an imbalance in the composition of the raw fuel gas, and the reformer often fails to exhibit adequate performance or the carbon monoxide cannot be sufficiently removed, thus lowering the performance of the fuel cell. In addition, it becomes impossible to satisfactorily control the humidity in the fuel cell, such that the fuel cell often fails to generate the prescribed output.

For these reasons, the present applicant has proposed in Japanese Patent Application No. Hei-11-125366 (unpublished) the fuel evaporator 100 shown in FIG. 23, with the object of effectively preventing creation of liquid pools for improved response of the fuel evaporator and to allow more rapid warming up of the fuel evaporator. The fuel evaporator 100 is provided with an evaporator body 110, a superheater 130 downstream from the evaporator body 110 and a raw fuel gas injection apparatus 140 above the evaporator body 110.

In the fuel evaporator 100, heated gas HG serving as a high temperature heat medium obtained by catalytic combustion of off gas (hydrogen-containing gas) generated in a fuel cell (not shown) at a catalytic combustor (not shown) is supplied as a heat source. The heated gas HG passes from an inlet 112in through a plurality of U-shaped heat medium tubes 112 arranged in the evaporation chamber 111 of the evaporator body 110, and reaches an outlet 112out. The heated gas HG then passes through a heated gas conduit 113 provided under the evaporation body 110, and is conducted to a superheater 130 mounted downstream from the evaporator body 110. Raw fuel liquid FL composed of a methanol and water mixture is injected as a mist from a fuel injection apparatus 140 and is heated to vaporization with the heat medium tubes 112 into raw fuel gas FG. The raw fuel gas FG is superheated as it passes through vapor tubes 131 of the superheater 130 and is conducted to a reformer (not shown) downstream from the superheater 130. The heat medium tubes 112 are U-shaped with the top and bottom tubing as the horizontal tubing on either side of the curved sections R', and as shown in FIG. 24, they are evenly arranged from top to bottom (vertically) and from side to side (horizontally). FIG. 24 is a cross-sectional view of FIG. 23 along line D—D'.

In this fuel evaporator 100, the bottom 111$b$ of the evaporation chamber 111 in the evaporator body 110 also serves as the top 113$t$ of the heated gas conduit 113. Thus, since heat is also supplied from the bottom 111$b$ of the evaporation chamber 111, creation of liquid pools is prevented, and even when liquid pools are created they are rapidly vaporized. The response of the fuel evaporator 100 is therefore improved.

The fuel evaporator must accomplish rapid and efficient vaporization of raw fuel liquid upon starting up or under extreme load fluctuations in order to yield the raw fuel gas.

In a conventional fuel evaporator 100, however, the amount of heat on the bottom 111$b$ or sides is not so great, and therefore liquid pools have formed on the bottom 111$b$ and sides of the evaporation chamber 103 of the fuel evaporator 100, due to pooling of raw fuel liquid that fails to vaporize.

Furthermore, since the heat medium tubes 112 are arranged horizontally, the raw fuel liquid FL injected from the raw fuel injection apparatus 140 has often pooled on the surface of the heat medium tubes 112, thus reducing the heat transfer efficiency of the heat medium tubes 112. The reduced heat transfer efficiency of the heat medium tubes 112 increases the amount of raw fuel liquid FL that falls under the evaporation chamber 111 without vaporizing above the evaporation chamber 111, but since the heat medium tubes 112 are evenly arranged from top to bottom and from side to side, there have been heat medium tubes 112 that do not contact with the falling raw fuel liquid FL; i.e., that contribute little to vaporization of the raw fuel liquid FL.

In addition, since the temperature of the heated gas flowing through the heat medium tubes 112 is lower at the lower side of the heat medium tubes 112 (at the heat medium tube outlets 112out), the amount of heat is insufficient at the bottom of the evaporation chamber 111 so that the raw fuel liquid FL often cannot vaporize at the lower side of the heat medium tubes 112, tending to result in formation of liquid pools.

When pooled raw fuel liquid is present in the evaporation chamber 111, the pooled raw fuel liquid can flow into the superheating chamber in cases where it runs along an upgrade. The unvaporized raw fuel liquid that has entered the superheating chamber can reach the reformer through the vapor tubes of the superheating chamber, and unreacted raw fuel liquid flowing into the reformer is a cause of reduced reforming efficiency and deterioration of the reformer.

SUMMARY OF THE INVENTION

Consequently, it is an object of the present invention to provide a fuel evaporator whereby warming up of the fuel evaporator can be rapidly accomplish liquid pools in the evaporator can be prevented with a simple structure, by effective utilization of the heat from the catalytic combustor.

It is another object to provide a fuel evaporator provided with a piping structure that allows rapid vaporization of raw fuel and effective utilization of the potential heat of the high temperature heat medium for vaporization of raw fuel liquid.

It is yet another object to provide a fuel evaporator that can effectively prevent flow of unvaporized raw fuel liquid in the fuel evaporator out of the evaporation chamber, and that can also prevent flow of unvaporized raw fuel liquid through the superheating chamber to the reformer.

It is yet another object to provide a fuel cell system with satisfactory response to loads by improved evaporation efficiency of raw fuel liquid in the fuel evaporator.

The present invention which overcomes the aforementioned problems is a fuel evaporator with an evaporation chamber that vaporizes raw fuel liquid with a high temperature heat medium, comprising a catalytic combustor installed adjacent to the evaporation chamber.

With this construction it is possible to apply more heat more rapidly to raw fuel liquid adhering as droplets onto the wall of the evaporation chamber or raw fuel liquid present as liquid pools, than by providing a separate combustor as in fuel evaporators of the prior art.

In the fuel evaporator according to the present invention, the catalytic combustor is preferably installed in close contact with the evaporation chamber.

With this construction it is possible to apply more heat more rapidly to raw fuel liquid adhering as droplets at sections in close contact with the catalytic combustor, or to raw fuel liquid pools.

In the fuel evaporator according to the present invention, preference is given to having a construction such that the contact side on which the catalytic combustor is in contact with the evaporation chamber forms the bottom surface of the evaporation chamber, and the bottom has a shape that follows the outer shape of the heat medium tube located nearest the bottom among the heat medium tubes in the evaporation chamber through which the high temperature medium flows.

With this construction it is possible to reduce the space for liquid pools under the evaporation chamber.

The fuel evaporator according to the present invention, preference is ginvn to having a construction such that the bottom of the catalytic combustor has a shape that is depressed from the periphery toward the center.

With this construction it is possible to increase the amount of heat near the center of the catalytic combustor compared to its outer periphery, for vaporization of more stored liquid.

The fuel evaporator according to the present invention may have an evaporation chamber that vaporizes raw fuel liquid with a high temperature heat medium and a high temperature heat medium conduit through which the high temperature heat medium flows after the raw fuel liquid has been vaporized. It is also preferable that a catalytic combustor is provided adjacent to the evaporation chamber, and the high temperature heat medium conduit is installed at a location of the evaporation chamber other than the location adjacent to the catalytic combustor.

With this construction it is possible to promote vaporization of raw fuel liquid with heat from the catalytic combustor that has not been utilized in the prior art. Rapid warming up can also be accomplished. Since the evaporation chamber can also be heated and warmed from the sides, it is possible to rapidly vaporize splashing droplets of raw fuel liquid adhering to the sides of the evaporation chamber. Rapid warming can also be accomplished.

Incidentally, the term "adjacent" in the claims includes cases where the catalytic combustor is provided in close contact with the evaporation chamber, as in this mode of the invention. When the evaporation chamber and the catalytic combustor are in close contact, the heat generated from the catalytic combustor is transferred to the evaporation chamber by conducted heat transfer. On the other hand, when a gap (space) is present between the evaporation chamber and the catalytic combustor, the heat generated by the catalytic combustor is transferred to the evaporation chamber by radiant heat transfer and convection heat transfer. That is, "adjacent" means that the heat generated by the catalytic combustor is transferred to the evaporation chamber by at least one heat transfer means from among conduction, radiation and convection, and this promotes vaporization of the raw fuel liquid (prevents formation of liquid pools) in the evaporation chamber.

The fuel evaporator according to another aspect of the present invention is provided with an evaporation chamber that vaporizes raw fuel liquid by heat received from a plurality of heat medium tubes through which a high temperature heat medium flows to produce raw fuel gas. A raw fuel injection portion that injects said raw fuel liquid into the heat medium tubes is provided in the evaporation chamber, and the heat medium tubes are situated in such a manner that those nearer the raw fuel injection portion are sparse and those further are dense.

Because the heat medium tubes are densely arranged at the section distant from the raw fuel injection portion in this construction, a high temperature zone is formed at the section distant from the raw fuel injector. The path of the injected raw fuel liquid is maintained in the proximity of the raw fuel injector, and therefore the raw fuel liquid spreads throughout the evaporation chamber. The fuel evaporator of the invention therefore exhibits highly satisfactory vaporization efficiency and does not form liquid pools easily.

The heat medium tubes according to the invention may be conduits of any type or shape, such as straight pipes or U-shaped or S-shaped pipes.

In this construction, it is possible to avoid noise due to oscillation or damage to the apparatus by interweaving wide and narrow sized conduits, by interweaving long and short conduits, by interweaving sparse and dense conduit arrangements or by appropriately combining these.

The fuel evaporator according to another aspect of the present invention may have a construction such that said evaporation chamber is provided with a tube holder portion that holds the heat medium tubes which are adjacent to the catalytic combustor and through which said high temperature heat medium flows, and has a section heated from said catalytic combustor, wherein a slanted section slanted from the horizontal with said tube holder portion directed downward is provided for at least part of said heat medium tubes.

With this construction, droplets of the raw fuel liquid injected on the outer surface of the heat medium tubes are moved in a fixed direction on the slanted section, to prevent significant growth with horizontal movement on the heat medium tubes. In addition, since the tube holder portion provided just directly above the catalyst layer outlet of the catalytic combustor and having a heated section is at high temperature, the droplets that have traversed the slanted section of the heat medium tubes up to the tube holder portion can be rapidly vaporized as they fall down on the evaporation chamber bottom while being heated by the high temperature tube holder.

The fuel evaporator according to another aspect of the present invention may have a construction such that the heat medium tubes are provided with a turbulence generating portion that disturbs the flow of the high temperature heat medium.

By thus providing a turbulence generating portion in the heat medium tubes, the flow is converted from a laminar flow to a turbulent flow as the high temperature heat medium passes through the heat medium tubes, thus creating an even temperature distribution in the radial direction of the tube. As a result, since a sufficient amount of heat can be applied to the outer surface of the tubes than with a laminar flow, the potential heat of the high temperature heat medium can be more effectively utilized for vaporization of the raw fuel liquid.

The fuel evaporator according to another aspect of the present invention may also have an evaporation chamber that vaporizes raw fuel liquid into raw fuel gas with a high temperature heat medium, the fuel evaporator comprising an evaporation chamber outlet that allows the raw fuel gas to flow out of the evaporation chamber formed in the evaporation chamber, and a raw fuel liquid shield that prevents flow of the raw fuel liquid provided under the evaporation chamber outlet.

With this construction, a raw fuel liquid shield that prevents outflow of the raw fuel liquid is provided under the evaporation chamber outlet. Thus, even when the unvaporized raw fuel liquid pools in the evaporation chamber it is possible to prevent the pooled raw fuel liquid from flowing out into the superheating chamber.

The fuel evaporator according to another aspect of the present invention may have a construction such that a raw fuel liquid storage section which stores the raw fuel liquid that has pooled under said evaporation chamber is formed in the evaporation chamber, and the raw fuel liquid shield extends from the lower end of the evaporation chamber outlet to at least a point above the raw fuel storage section.

With this construction, the raw fuel liquid shield extends from the lower end of the evaporation chamber outlet to a point above the raw fuel liquid storage section. Consequently, even when the raw fuel liquid that has pooled in the raw fuel liquid storage section pools up to a height under the evaporation chamber outlet, for example, it is possible to prevent the raw fuel liquid from flowing out from the evaporation chamber outlet.

The fuel evaporator according to another aspect of the present invention may have a construction such that ventilation means that prevents passage of liquid droplets of the raw fuel liquid while discharging the raw fuel gas is formed in the evaporation chamber outlet.

With this construction it is possible to prevent escape of raw fuel liquid droplets attempting to pass through the evaporation chamber outlet, while allowing outflow of the vaporized raw fuel gas. The ventilation means of the invention will typically be a metal mesh, punching plate or louver.

The fuel evaporator according to another aspect of the present invention may have a construction such that the evaporation chamber outlet conducts to a superheating portion which superheats raw fuel liquid that has been vaporized in the evaporation chamber by the high temperature heat medium that has passed through a high temperature heat medium conduit that conducts the high temperature heat medium that has vaporized the raw fuel liquid, vapor tubes that conduct raw fuel gas that has been discharged from the evaporation chamber outlet are installed in the superheater, and the raw fuel gas inlet for the vapor tubes is situated at a location lower than the raw fuel gas outlet.

With this construction, a raw fuel gas inlet for the vapor tubes provided in the superheating portion is situated at a location lower than the raw fuel gas outlet. Consequently, even when the unvaporized raw fuel liquid flows into the vapor tubes, it returns to the raw fuel gas inlet by the action of gravity, so that the raw fuel liquid flows out from the raw fuel gas inlet. It is therefore possible to effectively prevent the unvaporized raw fuel liquid from flowing out into the reformer.

Still another aspect of the present invention is a fuel cell system provided with a fuel evaporator having an evaporation chamber that vaporizes raw fuel liquid with a high temperature heat medium and an adjacent catalytic combustor that supplies the high temperature heat medium thereto, while also comprising a reformer that reforms raw fuel gas formed by vaporization of the raw fuel liquid into raw fuel gas, a fuel cell, and a raw fuel liquid tank that supplies the raw fuel liquid to the fuel evaporator.

With this construction, adhesion and pooling of raw fuel liquid in the evaporation chamber of the fuel evaporator can be effectively prevented, thus allowing the raw fuel gas to be appropriately supplied to the fuel cell. The fuel cell system thus exhibits satisfactory response. Moreover, since the catalytic combustor is provided adjacent thereto, the entire system can-be designed in a more compact form.

In the fuel cell system of the present invention, the fuel evaporator is preferably provided with a plurality of heat medium tubes through which the high temperature heat medium passes and a raw fuel injection portion that injects the raw fuel liquid into the heat medium tubes, wherein the heat medium tubes are situated in such a manner that those nearer the raw fuel injection portion are sparse and those further are dense.

With this construction, the raw fuel liquid can be spread more widely in the evaporation chamber of the fuel evaporator while the evaporation efficiency can be increased by the high temperature zone formed at a section distant from the raw fuel injector. It is therefore possible to achieve more suitable supply of the raw fuel gas to the fuel cell.

BRIEF DESCRIPTION OF THE DRAWINGS

FIG. 5 is an outline drawing of U-shaped tubes as set, one fitting inside another, in the direction of height of the evaporation chamber.

FIG. 14($a$) is a main portion cross-sectional view of a first embodiment of a turbulence generating portion in a heat medium tube according to the invention, and FIG. 14($b$) is a main portion cross-sectional view of a second embodiment of a turbulence generating portion in a heat medium tube according to the invention.

FIG. 16($a$) is an outline drawing of a first embodiment of twisted fins provided in a heat medium tube according to the invention, and FIG. 14($b$) is an outline drawing of a second embodiment of twisted fins provided in a heat medium tube according to the invention.

DESCRIPTION OF THE PREFERRED EMBODIMENTS

The fuel evaporator of preferred embodiments of the invention will now be explained in detail with reference to the attached drawings.

Figure 1:
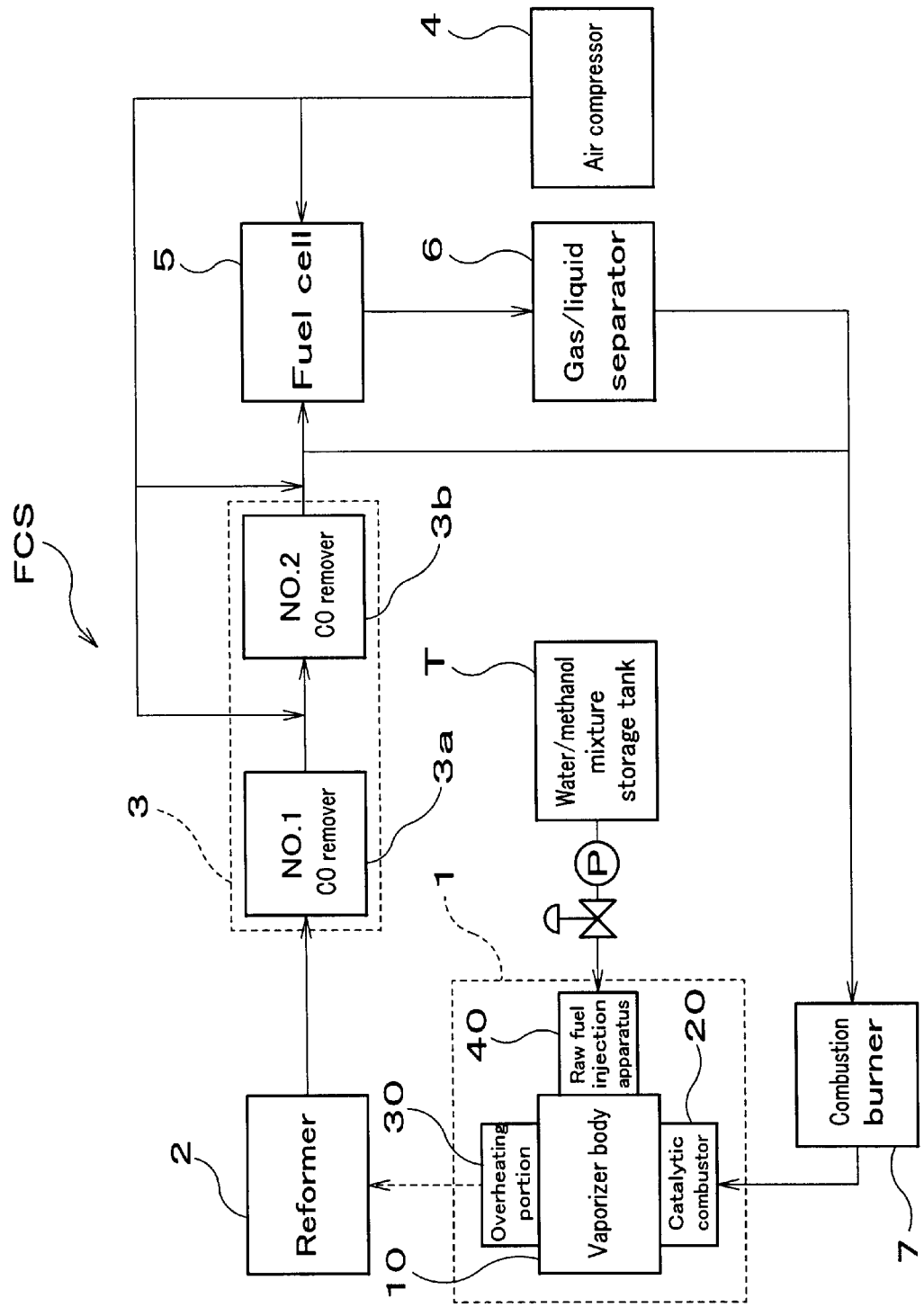
FIG. 1 is a constructional diagram of a fuel cell system applying a fuel evaporator according to an embodiment of the invention.
Figure 2:
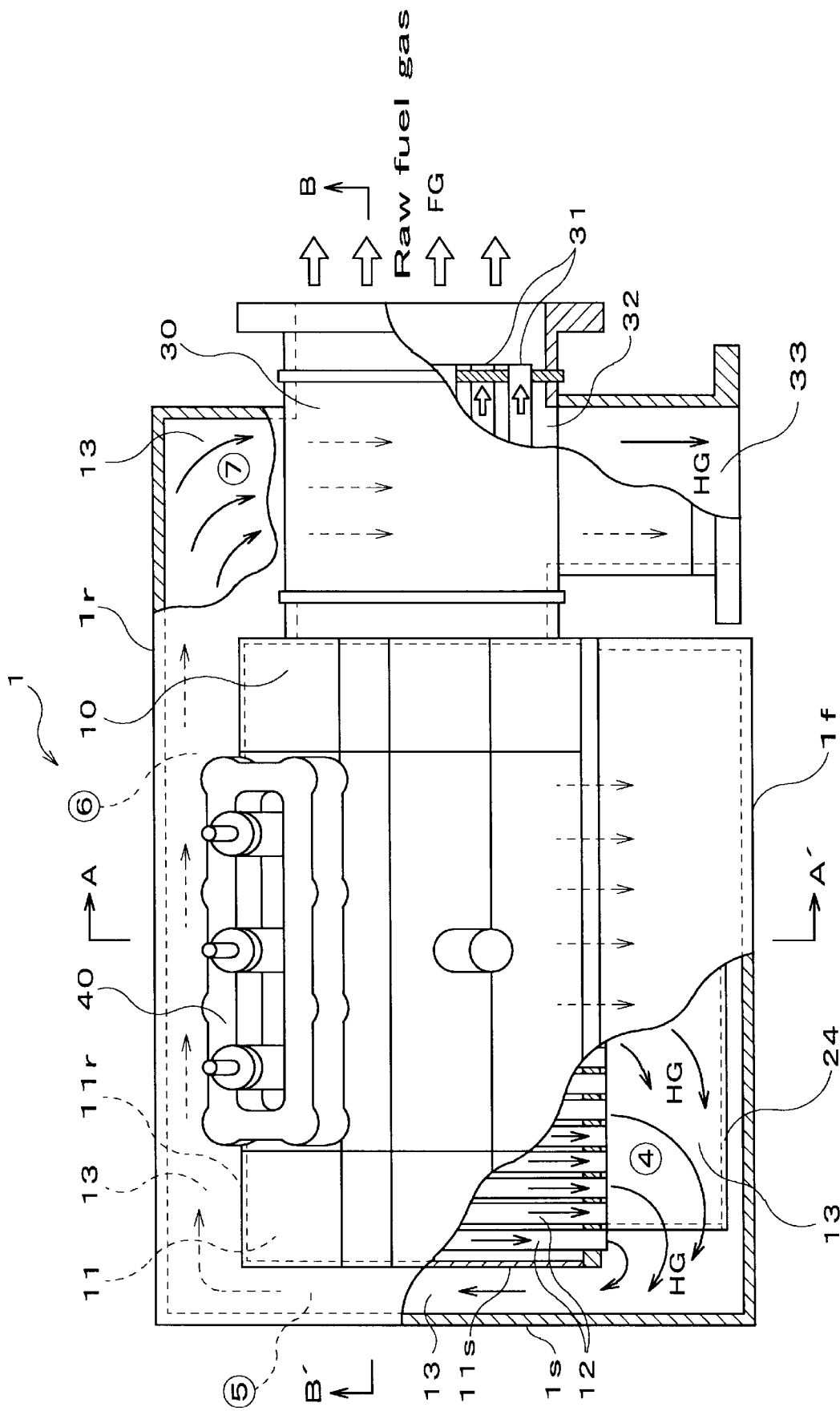
FIG. 2 is a partial cutaway plan view of a fuel evaporator according to the same embodiment of the invention.
Figure 3:
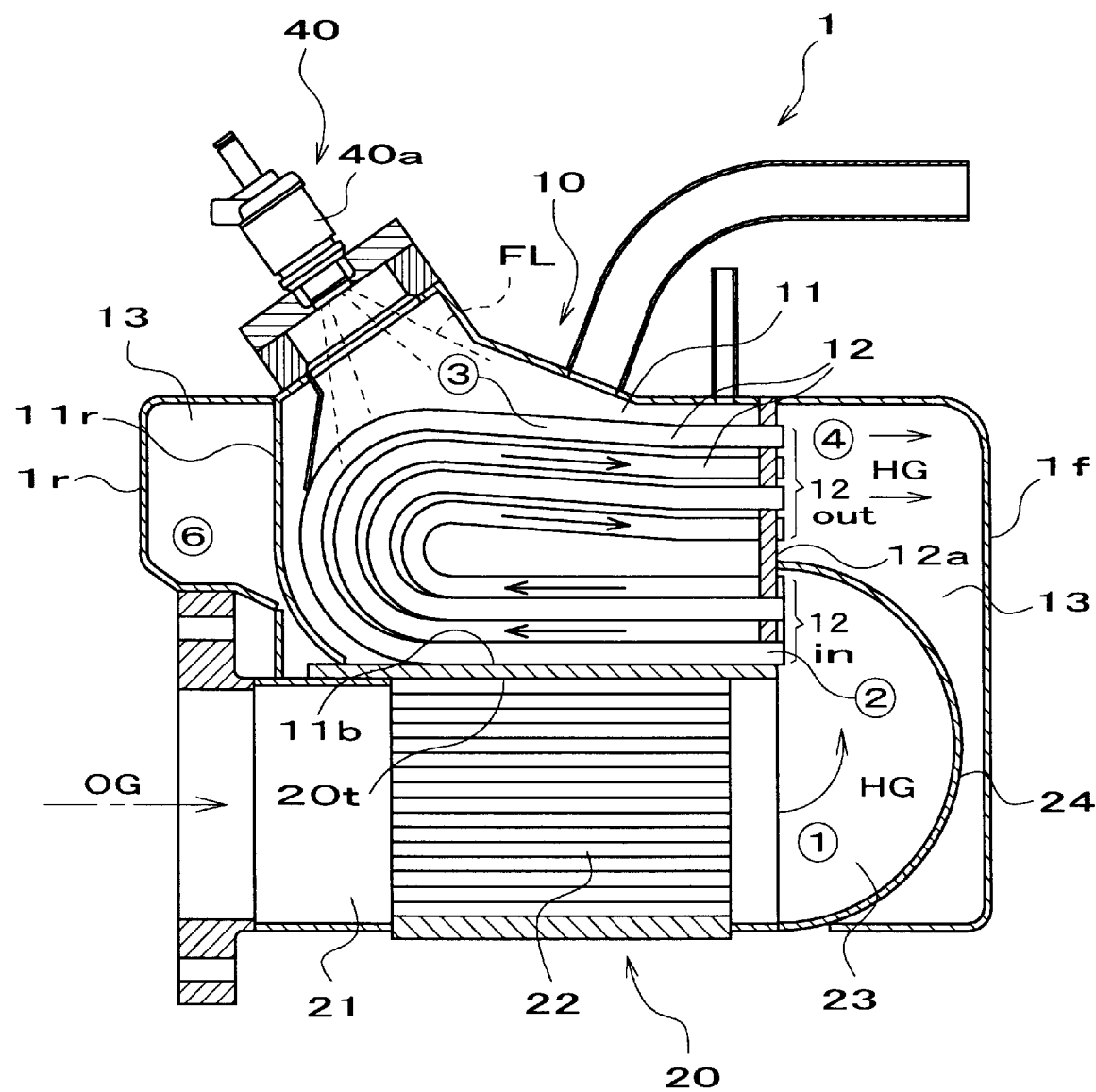
FIG. 3 is a cross-sectional view along line A—A' of FIG. 2.
Figure 4:
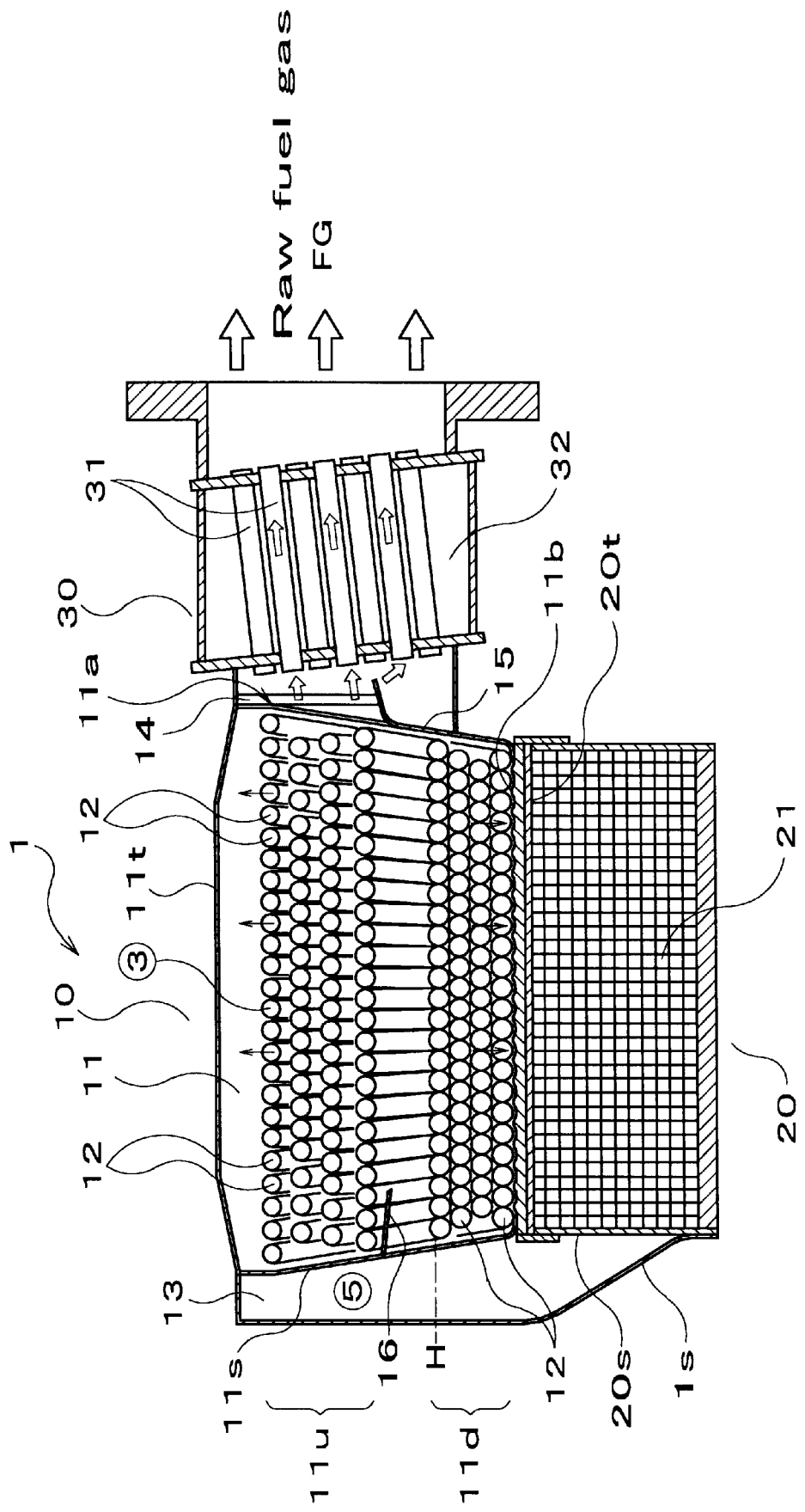
FIG. 4 is a cross-sectional view along line B—B' of FIG. 2.

FIG. 1 is a constructional diagram of a fuel cell system applying a fuel evaporator according to an embodiment of the invention. FIG. 2 is a partial cutaway plan view of a fuel evaporator according to the same embodiment. FIG. 3 is a cross-sectional view along line A—A' of FIG. 2. FIG. 4 is a cross-sectional view along line B—B' of FIG. 2.

According to this embodiment, the high temperature heat medium is heated gas HG generated by catalytic combustion at the catalytic combustor 20, and the high temperature heat medium conduit is a heated gas conduit 13.

[Fuel Cell System]

First, the construction and action of a fuel cell system FCS comprising a fuel evaporator 1 according to this embodiment will be explained with reference to FIG. 1. The fuel cell system FCS comprises a fuel evaporator 1, a reformer 2, a CO remover 3, an air compressor 4, a fuel cell 5, a gas/liquid separator 6, a combustion burner 7 and a raw fuel liquid tank T.

The fuel evaporator 1 has an evaporator body 10, a catalytic combustor 20, a superheating portion 30 and a fuel injection apparatus 40. In the fuel evaporator 1, the raw fuel liquid, such as a water/methanol mixture which is pressurized with a pump P from the raw fuel liquid tank T, is injected through the raw fuel injection apparatus 40 into the evaporator body 10 that has been heated to a high temperature, and the raw fuel liquid is vaporized into raw fuel gas. The heat source for vaporization of the raw fuel liquid is heated gas as the high temperature heat medium supplied from the catalytic combustor 20, and the heated gas is obtained by catalytic combustion of off gas or the like of the fuel cell 1 at the catalytic combustor 20. The raw fuel gas obtained in this manner is superheated at the superheating portion 30 and supplied to the reformer 2. The fuel evaporator 1 will be explained in greater detail below.

The reformer 2 reforms raw fuel gas that has been supplied from the fuel evaporator 1 into hydrogen-rich raw fuel gas, by steam reforming and partial oxidation. The reaction for steam reforming and partial oxidation is promoted by the action of a catalyst provided in the reformer 2. For partial oxidation of the raw fuel gas, air is supplied to the reformer 2 from an air compressor 4 or the like, through a pipe (not shown).

The raw fuel gas obtained in this manner is subjected to a selective oxidation reaction on carbon monoxide in the presence of a catalyst at the CO remover 3. This converts the carbon monoxide in the raw fuel gas to carbon dioxide and thereby removes it. The removal of carbon monoxide serves to prevent poisoning of the platinum catalyst of the fuel cell 5 (solid polymer type), and thus prolong the usable life of the fuel cell 5. The CO remover 3 has a No. 1-CO remover 3$a$ and a No. 2-CO remover 3$b$, and it minimizes the concentration of carbon monoxide in the raw fuel gas. The temperature of the raw fuel gas in the CO remover 3 is controlled by a heat exchanger (not shown) so that undesirable reactions such as reverse shift or methanation do not occur.

The air compressor 4 compresses air-and supplies oxygen required by the fuel cell 6. As mentioned above, the air compressor 4 also supplies air for partial oxidation at the reformer 2. The air compressor 4 also feeds air to the No. 2-CO remover 3$b$ for conversion of carbon monoxide in the raw fuel gas to carbon dioxide. The air compressor 4 may be powered utilizing the energy from expansion of the off gas discharged from the fuel cell 5.

As mentioned above, the fuel cell 5 is a solid polymer type. The raw fuel gas from which carbon monoxide has been removed is supplied to the hydrogen terminal of the fuel cell 5, and air from the air compressor 4 is supplied to the oxygen terminal of the fuel cell 5. Inside the fuel cell 5, electricity is generated while water is produced from the hydrogen and oxygen based on an electrochemical reaction in the presence of the platinum catalyst. The electricity may be used as a power source for an electric automobile or the like.

The off gas containing unused hydrogen and the water that is produced are discharged from the hydrogen terminal of the fuel cell 5, but these are separated into gas and liquid by the gas/liquid separator 6. The off gas is supplied to the combustion burner 7 and burnt when the fuel cell system FCS is started, and this warms up the catalytic combustor 20, etc. After warming of the fuel cell system FCS has been completed, off gas is fed to the fuel evaporator 1 without being burnt at the combustion burner 7, and it is subjected to catalytic combustion at the catalytic combustor 20 and used as a heat source for vaporization of the raw fuel liquid.

When the fuel cell system FCS is started, fuel for the catalytic combustion (such as methanol) is supplied to the catalytic combustor 20 instead of off gas.

This is the construction and action of a fuel cell system FCS employing a fuel evaporator 1 according to the present embodiment.

[Fuel Evaporator]

A fuel evaporator implemented according to the present invention will now be explained (with reference to FIGS. 2 to 4).

The fuel evaporator 1 comprises an evaporator body 10, a catalytic combustor 20, a superheating portion 30 and a fuel injection apparatus 40.

As concerns the general positional relationship between these components, the evaporator body 10 is mounted above the catalytic combustor 20, the superheating portion 30 is to the side of the evaporator body 10 and the fuel injection apparatus 40 is above the evaporator body 10.

The evaporator body 10 has a box-shaped evaporation chamber 11 in which a plurality of U-shaped heat medium tubes 12 are situated.

Here, the U-shaped heat medium tube's 12 have the shapes shown in FIGS. 5($a$) to ($d$), and for example, a sloping portion 12 disproved for at least a portion of the upper tubing A of the tubing A, B provided above and below the curved section R in FIG. 5($a$), so as to be lower in the horizontal direction toward the direction of the heat medium tube holder plate 12$a$. That is, the structure is such that the curved section R of each heat medium tube 12 is bent more than 180°, and both ends are anchored in the tube plate, that is, the heat medium tube holder plate 12$a$. By forming the heat medium tubes 12 in this manner, the droplets of raw fuel liquid FL injected onto the outer surface of the heat medium tubes 12 can be kept from growing large while moving horizontally on the horizontal tube portions. The heat medium tube holder plate 12$a$ is at high temperature, since the heat of the catalytic combustor 20 is transferred thereto by heat conduction from the heat receiver 12$cb$ directly above the outlet of the catalytic layer 22 of the catalytic combustor 20. Consequently, the liquid droplets that have been transferred to the heat medium tube holder plate 12$a$ across the heat medium tubes 12 are heated at the high-temperature heat medium tube holder plate 12$a$ while falling to the bottom of the evaporation chamber 11, thus allowing rapid vaporization of the liquid droplets.

Figure 6:
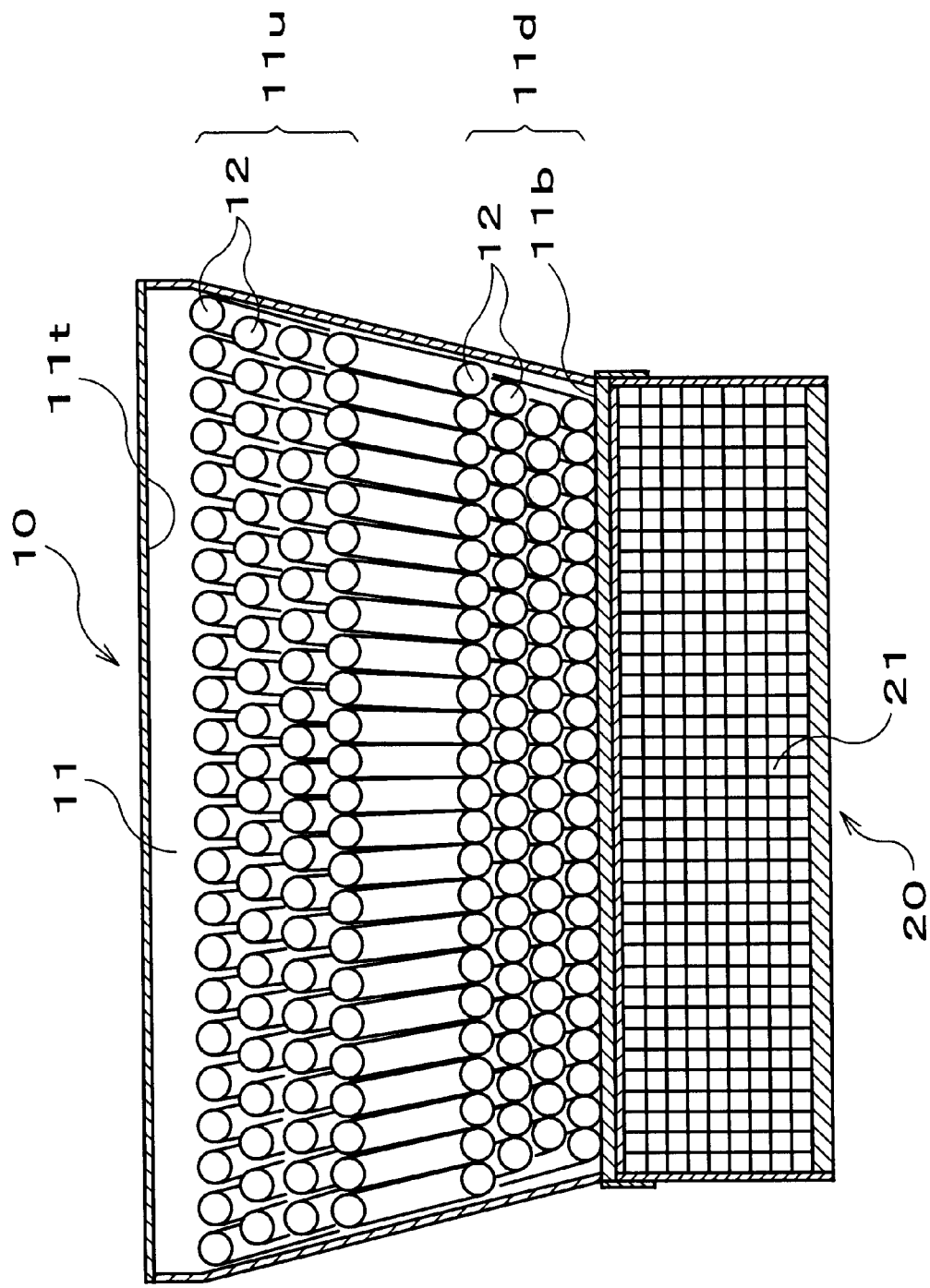
FIG. 6 is a schematic cross-sectional view showing an arrangement of the heat medium tubes that is different from that of FIG. 4.
Figure 7:
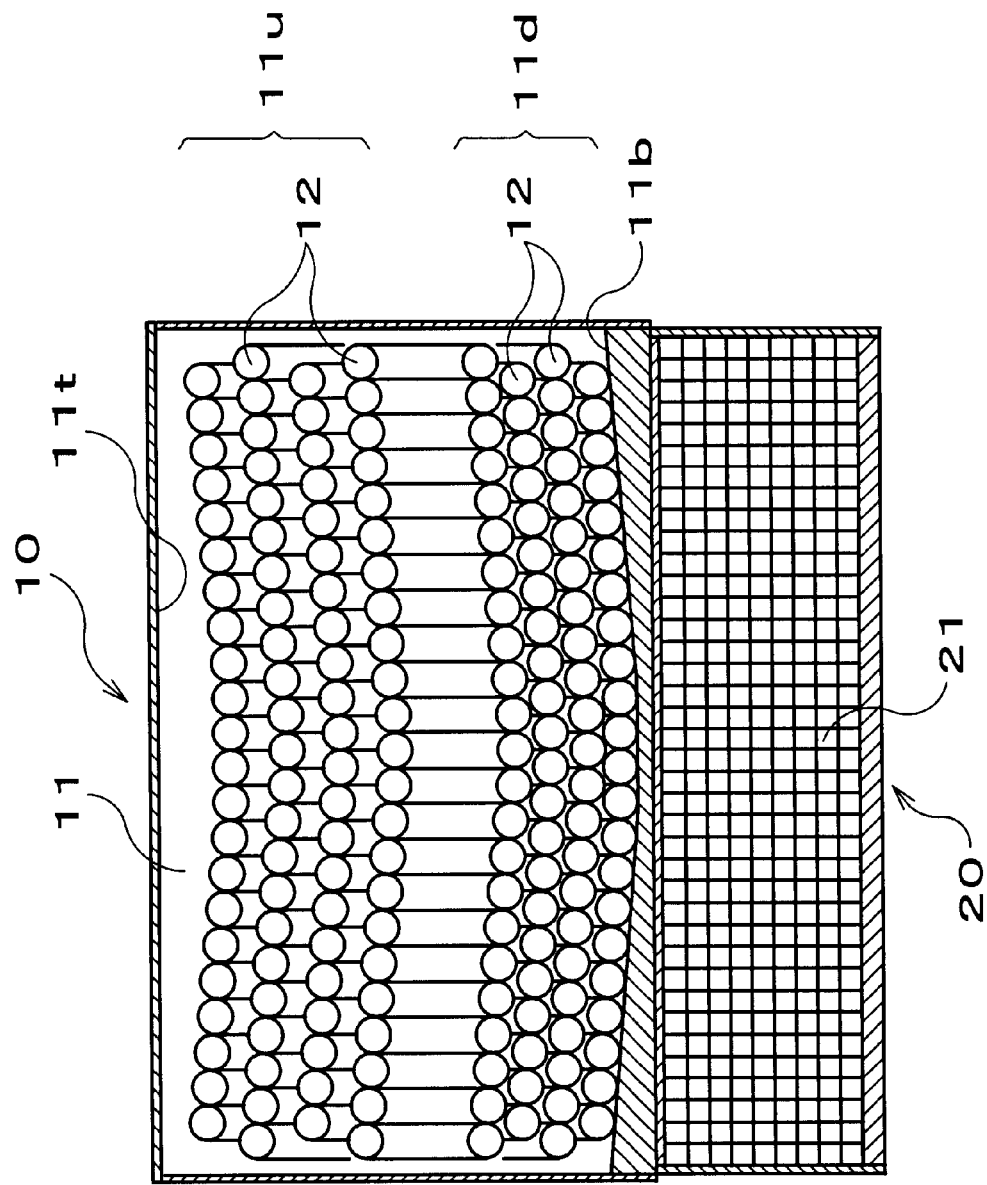
FIG. 7 is a schematic cross-sectional view showing an arrangement of the heat medium tubes that is different from that of FIG. 4 or FIG. 6.

The heat medium tubes 12 are arranged and anchored in a nested fashion onto the heat medium tube holder plate 12$a$ in the order of ($d$) to ($a$). The heat medium tubes 12 have a U-shaped structure here, but they may also be straight with the sloping section 12$d$ comprising a portion thereof. Examples of arrangements of the heat medium tubes 12 are shown in FIGS. 4, 6 and 7.

FIG. 4 is a cross-sectional view of FIG. 2 along line B—B', showing an arrangement of the heat medium tubes. FIG. 6 is a schematic cross-sectional view showing an arrangement of the heat medium tubes that is different from that of FIG. 4 (from the same perspective as FIG. 4). FIG. 7 is a schematic cross-sectional view showing an arrangement of the heat medium tubes that is different from that of FIG. 4 or FIG. 6 (from the same perspective as FIG. 4).

(1) First, a first example of a heat medium tube arrangement will be explained with reference to FIG. 4. The heat medium tubes 12 in this case are U-shaped tubes, as mentioned above.

Heated gas HG flows through the insides of the heat medium tubes 12 from the lower portion 11$d$ of the evaporation chamber to the upper portion 11$u$ of the evaporation chamber. The spacing between the heat medium tubes 12 at the upper portion 11$u$ of the evaporation chamber widens in the vertical direction and in the horizontal direction. The spacing between the heat medium tubes 12 at the lower portion 11$d$ of the evaporation chamber narrows in the vertical direction and in the horizontal direction. Consequently, the heating tubes 12 are arranged sparsely toward the upper part of the evaporation chamber 11 (the upper portion 11$u$ of the evaporation chamber) and densely toward the lower part (the lower portion 11$d$ of the evaporation chamber). The evaporation chamber 11 has an inverted trapezoidal shape in order to accommodate this arrangement of the heat medium tubes 12, and the upper portion 11$u$ of the evaporation chamber has a wider spacing (wider cross-sectional area) than the lower portion 11$d$ of the evaporation chamber. The raw fuel liquid FL is injected from the top surface of the evaporation chamber 11.

With the heat medium tube arrangement shown in FIG. 4, a high temperature zone is formed at the lower portion 11$d$ of the evaporation chamber where the heat medium tubes 12 are densely arranged. Thus, the raw fuel liquid FL that has been injected from the upper portion 11$u$ of the evaporation chamber and is unvaporized at the upper portion 11$u$ of the evaporation chamber (most of it is vaporized at the upper portion 11$u$ of the evaporation chamber) increases in temperature toward the lower portion 11$d$ of the evaporation chamber while moving and dropping (and partially evaporating), so that it is completely vaporized at the lower portion 11$d$ of the evaporation chamber into raw fuel gas FG. That is, for vaporization of the unvaporized raw fuel liquid FL, the upper portion 11$u$ of the evaporation chamber is used as a temperature increasing zone for the unvaporized raw fuel liquid FL while the lower portion 11$d$ of the evaporation chamber is used as the evaporation zone for the unvaporized raw fuel liquid FL. Unvaporized raw fuel liquid FL refers to law fuel liquid FL that has not been fully vaporized at the upper portion 11$u$ of the evaporation chamber.

Because the spacing between the heat medium tubes 12 is wider at the upper portion 11$u$ of the evaporation chamber, even if film boiling occurs at the upper portion 11$u$ of the evaporation chamber, the film boiling section cannot easily grow to large liquid drops capable of straddling between the heat medium tubes 12. That is, they are blown away by the air stream created caused by injection of the raw fuel liquid FL before they can grow large, and they easily fall down by the force of gravity. Consequently, the raw fuel liquid FL injected from the upper portion 11$u$ of the evaporation chamber spreads more easily across the entire evaporation chamber 11. Even if liquid drops form straddling the heat medium tubes 12 due to film boiling at the lower portion 11$d$ of the evaporation chamber, it constitutes no significant problem that could hinder the path of the injected raw fuel liquid FL. Also, even if film boiling occurs in the heat medium tubes 12 arranged at the upper portion 11$u$ of the evaporation chamber leading to large growth, it will tend to fall downward as drops by the force of gravity. Even if film boiling sections occur where the drops have fallen downward, these film boiling sections will rupture by the impact of falling. In other words, even when film boiling occurs at the upper portion of the evaporation chamber, the sections where film boiling has occurred tend to fall downward, and once they have fallen downward they are either broken up into fine droplets (while increasing the heat receiving area), or they rupture the film boiling sections toward the bottom (while increasing the heat receiving area). The arrangement of the heat medium tubes in the evaporation chamber 11 as a whole, therefore, is such that film boiling occurs with difficulty on the surface of the heat medium tubes 12 and the large growth of film boiling sections is inhibited (thus promoting their vaporization).

The lower portion 11d of the evaporation chamber is a high temperature zone and therefore liquid pools that form there are readily vaporized.

(2) A second example of a heat medium tube arrangement will be explained with reference to FIG. 6.

The heat medium tubes 12 are U-shaped like the heat medium tube arrangement shown in FIG. 4, and the heated gas HG flows through the inside of the heat medium tubes 12 from the lower portion 11d of the evaporation chamber toward the upper portion 11u of the evaporation chamber. The cross-sectional shape of the evaporation chamber 11 is also inverse trapezoidal like the heat medium tube arrangement shown in FIG. 4. The heat medium tube arrangement shown in FIG. 6 has a wider spacing between the heat medium tubes 12 than the heat medium tube arrangement shown in FIG. 4.

The heat medium tube arrangement shown in FIG. 6 basically has the same operation and action as the heat medium tube arrangement shown in FIG. 4, but since the heat medium tube arrangement shown in FIG. 6 have a wider spacing between the heat medium tubes 12, it has an advantage in that sections where film boiling occurs, in cases where film boiling does occur, tend to drop downward more readily.

(3) A third example of a heat medium tube arrangement will be explained with reference to FIG. 7. The heat medium tubes are U-shaped like the heat medium tube arrangement exemplarily shown in FIG. 4 and FIG. 6, and the heated gas HG flows through the inside of the heat medium tubes 12 from the lower portion 1id of the evaporation chamber toward the upper portion 11u of the evaporation chamber. Unlike the heat medium tube arrangement shown in FIG. 4 and FIG. 6, the cross-sectional shape of the evaporation chamber 11 shows the same width for the upper portion 11u of the evaporation chamber and the lower portion 1id of the evaporation chamber. Consequently, the spacing to the right and left of each heat medium tube 12 is the same from the upper portion 11u of the evaporation chamber to the lower portion 11d of the evaporation chamber. However, the spacing above and below each heat medium tube 12 is wider at the upper portion 11u of the evaporation chamber.

With the arrangement of heat medium tubes 12 exemplarily shown in FIG. 7, a high temperature zone is formed at the lower portion 11d of the evaporation chamber where the heat medium tubes 12 are more densely arranged. Consequently, as mentioned above, when unvaporized raw fuel liquid FL is vaporized, the upper portion 11u of the evaporation chamber is used as a temperature increasing zone for the unvaporized raw fuel liquid FL while the lower portion 11d of the evaporation chamber is used as the evaporation zone for the unvaporized raw fuel liquid FL. This allows vaporization of the raw fuel liquid FL to be accomplished more efficiently. Furthermore, since the lower portion 11d of the evaporation chamber is a high temperature zone, liquid pools do not easily form and even when they do form they are readily vaporized.

Since the spacing above and below the heat medium tubes 12 is wider at the upper portion 11u of the evaporation chamber, film boiling sections straddling above and below the heat medium tubes 12 do not easily form (they tend to fall downward).

As shown in FIG. 3, the front of the evaporation chamber 11 is blocked by the heat medium tube holder plate 12a that holds the heat medium tubes 12, and it keeps the heated gas HG and raw fuel gas FG from mixing together. The heat medium tubes 12 are open at both ends, and the construction is such that the heated gas HG enters the heat medium tubes 12 from the lower ends of the heat medium tubes 12 (the heat medium tube inlets 12in) and escapes from the upper ends of the heat medium tubes 12 (the heat medium tube outlets 12out). The heat medium tube outlets 12out constitute the starting end of the heated gas conduit 13, as will be explained below.

The evaporator body 10 vaporizes the raw fuel liquid FL to raw fuel gas FG in the evaporation chamber 11, and the raw fuel gas FG is conducted to the superheater 30 through the evaporation chamber outlet 11a formed in the evaporator body 10 (see FIG. 4).

Figure 8:
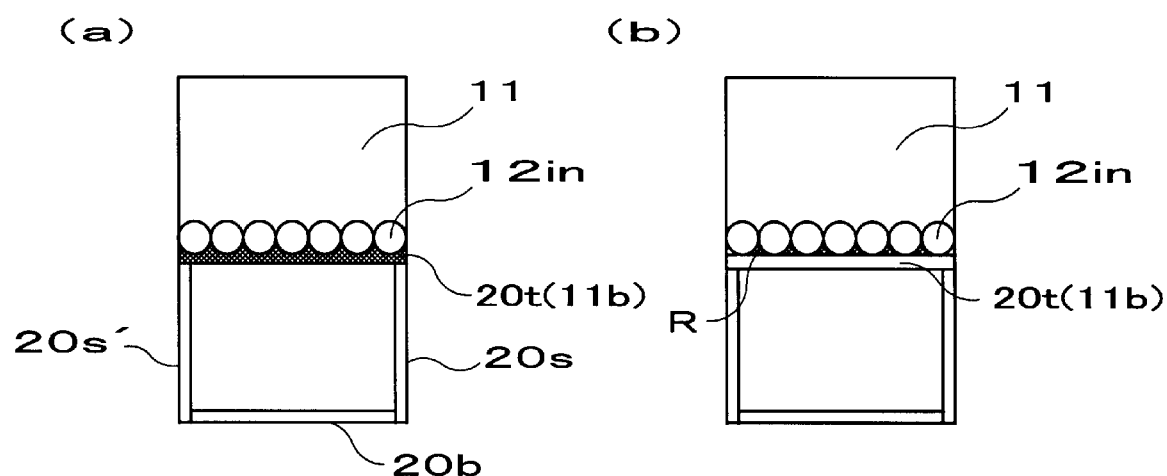
FIGS. 8(a) and (b) are each cross-sectional views along line B—B' of FIG. 2, showing other embodiments of the invention.

The catalytic combustor 20 is a combustor that generates high temperature heated gas HG by catalytic combustion of off gas OG, an inlet channel 21 for the off gas OG, composed primarily of a catalyst layer 22 and an outlet channel 23, and it is surrounded by a top plate 20t, a bottom plate 20b and side plates 20s, 20s' made of a metal such as highly heat resistant and corrosion resistant stainless steel such as SUS316 or the like, similar to the heat medium tubes (see FIG. 8). Incidentally, the top plate 20t also serves as the bottom plate of the evaporator 11. That is, the top surface of the catalytic combustor 20 is preferably directly attached to the bottom surface of the evaporator 11.

As shown in FIG. 8(a), the bottom surface of the evaporation chamber 11b has a cross-sectional waveform construction matching the shape (arrangement) of the heat medium tubes 12 positioned at the lowermost layer of the plurality of arranged heat medium tubes 12 (12in in FIG. 8(a)), and it is designed to prevent large liquid pools. A slight space is provided between the bottom surface of the evaporation chamber 11b and the heat medium tubes 12b positioned at the lowermost layer, and contact between the two due to vibrations, etc. is prevented. This construction of the bottom surface of the evaporation chamber 11b can minimize liquid pool spaces R in which liquid pools readily form at the lower portion of the evaporation chamber 11, compared to when the top surface 20t of the catalytic combustor 20 is formed flat (FIG. 8(b)).

For providing a wider heat transfer area between the evaporation chamber 11, the cross-sectional shape of the catalyst layer 22 is preferably an approximate rectangle formed with a width matching the width of the bottom surface 11b of the evaporation chamber 11, and it is preferably packed with a honeycomb shaped catalyst. The catalyst material may be a Pt-based catalyst. The carrier used is usually a silica-based or alumina-based carrier.

Before and after the catalyst layer 22 there are provided an inlet channel 21 for introduction of the substance to be burned into the catalytic combustor 20, and an outlet channel 23 comprising a partition plate 24 dividing the interior of the heated gas conduit 13 so that the flow direction of gas can be altered 180° when the high-temperature heated gas generated at the catalyst layer 22 flows downstream (in the example illustrated, the cross-section is a semi-circle); the off gas OG of the hydrogen terminal of the fuel cell 5, which is the substance to be burned, i.e. the hydrogen/oxygen mixed gas, is introduced from the inlet channel 21 and subjected to catalytic combustion at the catalyst layer 22 for conversion to high-temperature heated gas HG (typically at 650–700° C.), and the heated gas HG that has been heated in this manner is then fed from the outlet channel 23 to the evaporation chamber 11.

According to the invention, the catalytic combustor 20 must be provided adjacent to the evaporation chamber 11, and although FIG. 2–FIG. 4 show the top plate 20*t* of the catalytic combustor in a state of particularly close contact with the bottom surface of the evaporation chamber 11, the construction may have the side 20*s* or 20*s*' of the catalytic combustor 20 adjacent to the side of the evaporation chamber 11.

Figure 9:
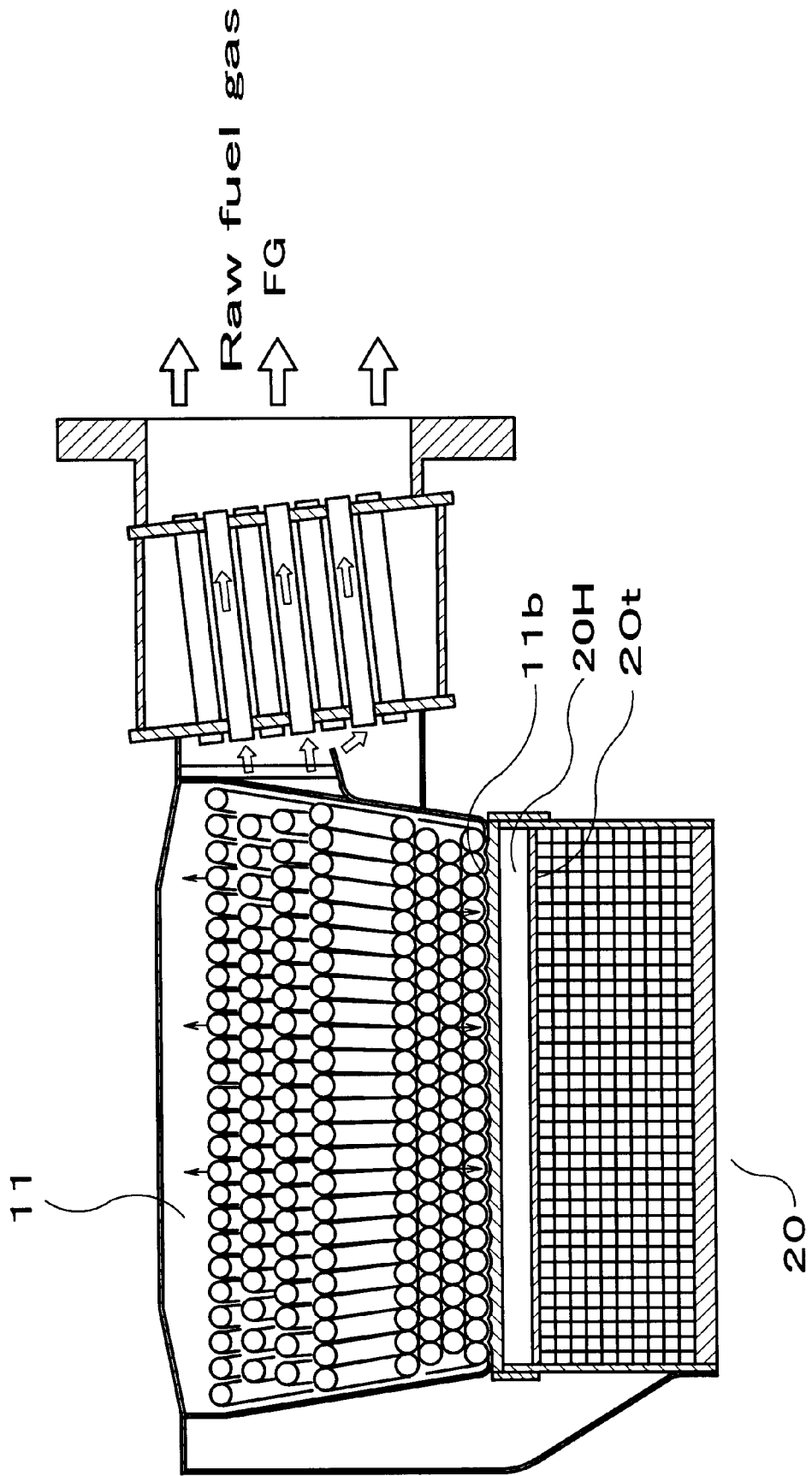
FIG. 9 is a cross-sectional view along line B—B' of FIG. 2.

With this construction, heat from the catalytic combustor 20 that has been brought to high temperature by catalytic combustion can radiate or be transferred to the section of the evaporation chamber 11 that is adjacent to the catalytic combustor 20. Not only is the construction simplified since the catalytic combustor 20 and evaporation body 10 need not be connected with piping, but the design can also be made more compact, compared to a design where it is provided separately from a conventional catalytic combustor 20. A thin heater 20H or the like may also be mounted between the catalytic combustor 20 and the evaporation chamber 11, as shown in FIG. 9.

Here, heat can be supplied from the heater H to the evaporation chamber 11 to promote vaporization even without starting the catalytic combustor 20.

The term "adjacent" used according to the present invention, therefore, means that the catalytic combustor 20 is situated at a location allowing effective transfer of heat from the catalytic combustor 20 to the evaporation chamber 11.

The heat transferred to the evaporation body 10 in this manner rapidly vaporizes the raw fuel liquid FL present as liquid droplets on the walls of the evaporation chamber or as liquid pools, converting them to raw fuel gas FG.

The location in which the catalytic combustor 20 is installed is not particularly restricted so long as it can transfer heat to the evaporation chamber 11 as described above to vaporize the raw liquid fuel present as liquid in the evaporation chamber 11, but the top surface 20*t* of the catalytic combustor 20 and the bottom surface of the evaporation chamber 11 are preferably in close contact as shown in FIG. 2 to FIG. 4, and most preferably, they are directly attached. For transfer of more heat to the evaporation chamber 11, the cross-sectional shape of the catalytic combustor 20 is preferably an approximate rectangle that is longer in the lengthwise direction of the width matching the width of the bottom surface 11*b* of the evaporation chamber 11.

With this construction, it is possible to more effectively transfer heat to the entire evaporation chamber and especially to the bottom surface 11*b* where liquid pools tend to form.

The superheating portion 30 is mounted downstream from the evaporation chamber outlet 11*a* in a configuration protruding from one side of the evaporation body 10. The superheating portion 30 is a shell and tube-type heat exchanger; raw fuel gas FG passes through the tube side (vapor tube 31 side), heated gas HG passes through the frame side (superheating chamber 32 side), and the condensable raw fuel gas FG is superheated by the heated gas HG, and is dried and vaporized to prevent condensation of the raw fuel gas FG.

A metal mesh 14 is installed as ventilation means in the evaporation chamber outlet 11*a*. The metal mesh 14 allows passage of the vaporized raw fuel gas FG while preventing passage of liquid droplets of unvaporized raw fuel liquid FL. A raw fuel liquid shield 15 is also provided under the evaporation chamber outlet 11*a* to prevent escape of the raw fuel liquid. The raw fuel liquid shield 15 extends above the lower end of the evaporation chamber outlet 11*a*, and the metal mesh 14 is fitted on top strip of the evaporation chamber outlet 11*a* and the raw fuel liquid shield 15.

The raw fuel liquid shield 15 also extends above the upper end surface H of the raw fuel liquid reservoir 11*b*. Thus, even when liquid pools form in the evaporation chamber 11 and ripples are created in the pooled raw fuel liquid FL by movement of the automobile, the presence of the raw fuel liquid shield 15 can prevent escape of the raw fuel liquid FL into the superheating portion 30 located outside the evaporator body 10.

Separately, a fuel splash reflecting plate 16 is mounted on the side of the evaporation chamber 11 opposite the side on which the raw fuel liquid shield 15 is provided. The fuel splash reflecting plate 16 serves the role of downwardly reflecting liquid droplets of the raw fuel liquid that have splashed in the evaporation chamber 11.

When raw fuel liquid FL injected by the raw fuel injection apparatus 40 shown in FIG. 2 and FIG. 3 has contacted and splashed onto the heat medium tubes 12, the raw fuel liquid FL that has contacted the lower heat medium tubes 12*in* of the heat medium tubes 12 is kept from entering the superheating portion 30 located outside the evaporator body 10 by the metal mesh 14 provided on the raw fuel liquid shield 15 or evaporation chamber outlet 11*a*. The liquid that has contacted and splashed onto the upper heat medium tubes 12*out* of the heat medium tubes 12 is kept from entering the superheating portion 30 mainly by the presence of the metal mesh 14.

Figure 10:
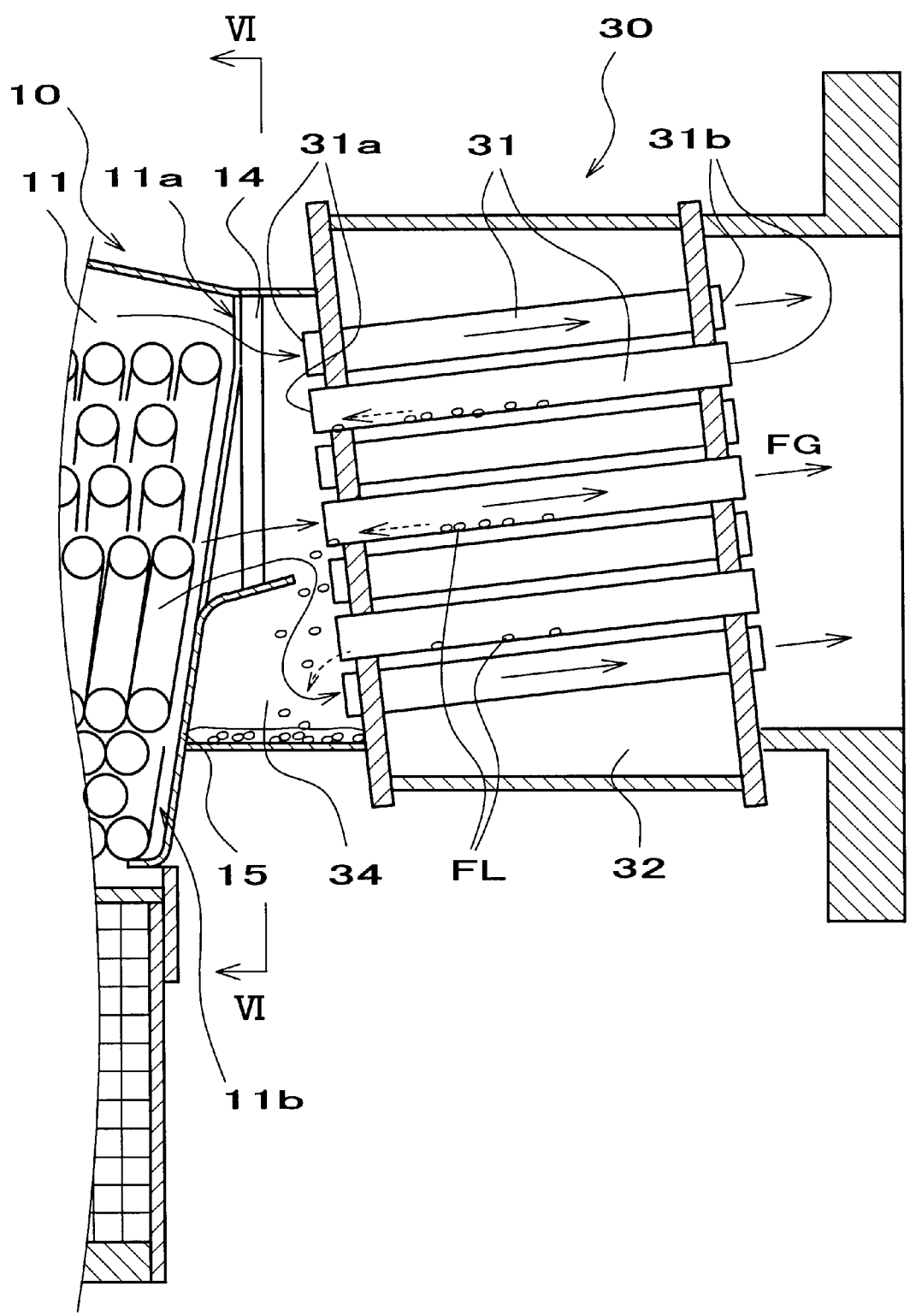
FIG. 10 is a front cross-sectional view showing a structure preventing flow out of raw fuel liquid for a fuel evaporator according to the invention.
Figure 11:
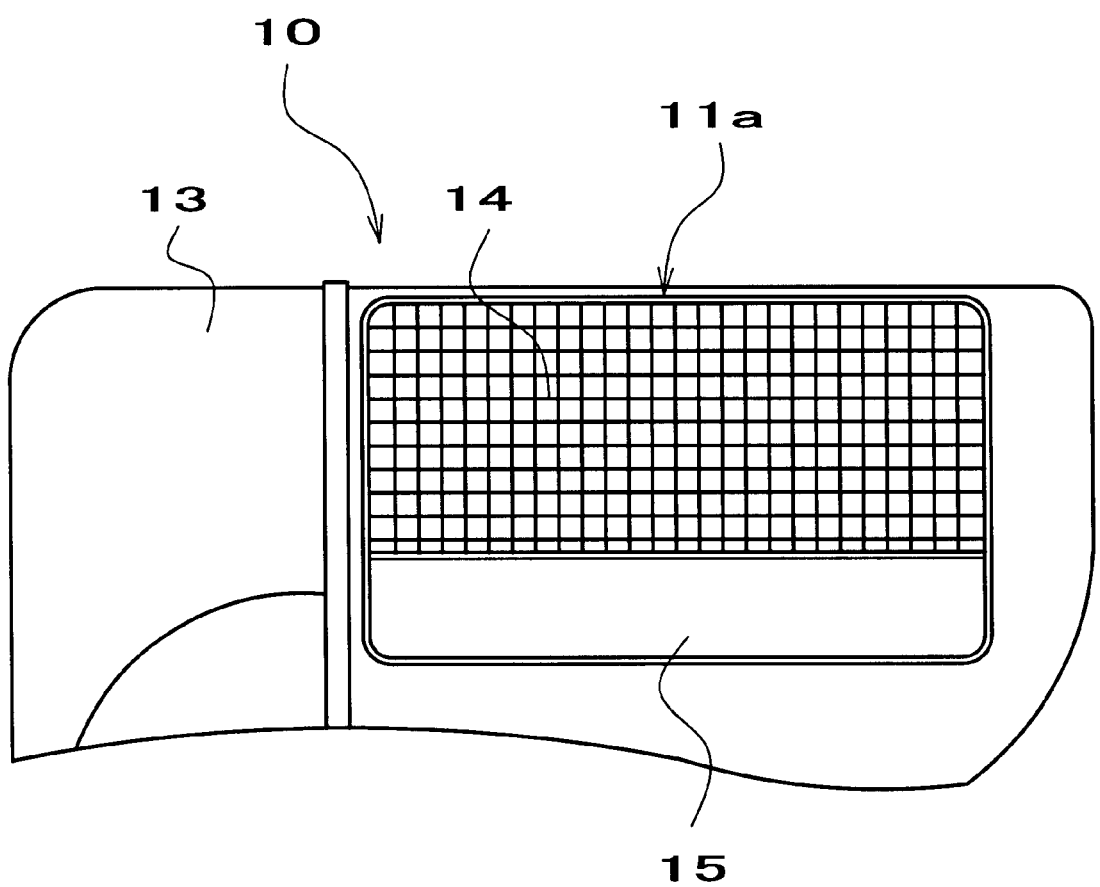
FIG. 11 is a cross-sectional view along line VI—VI of FIG. 9.

The structure preventing escape of the raw fuel liquid in the superheating portion 30 will now be explained with reference to FIG. 10 and FIG. 11. The vapor tubes 31 installed in the superheating portion 30 are inclined from the horizontal, and the raw fuel gas inlets 31*a* are arranged at positions lower than the raw fuel gas outlets 31*b*. A space 34 is formed below the raw fuel gas inlets 31*a*.

Even when raw fuel liquid FL has adhered to the insides of the vapor tubes 31 by liquefaction, etc. in the vapor tubes 31, the inclination of the vapor tubes 31 causes the raw fuel liquid FL to slip down toward the raw fuel gas inlets 31*a* and flow out from the raw fuel gas outlets 31*a* and accumulate in the space 34. It is thereby possible to keep the raw fuel liquid FL from flowing out to the reformer 2 side shown in FIG. 1. The inclination angle of the vapor tubes 31 is about 5° for this embodiment, and while the range is not particularly restricted, it is preferably set to within 3–10°. At smaller than 3° there is a greater chance that the raw fuel liquid FL will fail to slip down toward the raw fuel gas inlets 31*a*. At larger than 10°, the bulk of the superheating portion 30 may become too great.

By connecting the space 34 to the inside of the evaporation chamber 11 by a load-back conduit (not shown), it is possible to load the raw fuel liquid pooled in the space 34 back into the evaporation chamber 11 for vaporization. Alternatively, separate removal means may also be provided to remove the raw fuel liquid FL pooled in the space 34.

It is thus possible to keep the unvaporized raw fuel liquid FL from flowing out to the reformer 2. Also, even when the raw fuel liquid FL has entered the superheating portion 30, it may be loaded back to the evaporation chamber 11 to further increase the vaporization rate of the raw liquid fuel.

Incidentally, when the raw fuel liquid FL is adequately vaporized in the evaporation chamber 11 and the raw fuel gas FG does not condense until it reaches the reformer 2 shown in FIG. 1, the raw fuel gas FG vaporized in the evaporation chamber 11 may be introduced into the reformer 2 directly without passing through the superheating portion 30.

The raw fuel injection apparatus 40 is an injection apparatus with a single-fluid nozzle, which injects raw fuel liquid FL into the evaporation chamber 11. The raw fuel injection apparatus 40 is mounted on the top surface of the evaporation chamber 11t, and in order to utilize the potential heat of the high temperature heated gas HG efficiently, the raw fuel liquid FL is injected primarily in the direction along the plurality of heat medium tubes 12 provided in the evaporation chamber 11 (the direction toward the heat medium tube holder plate 12a).

The fuel evaporator 1 has a heated gas conduit 13, but in the fuel evaporator 1 described here, a heated gas conduit 13 starting from the heat medium tube outlets 12out and reaching to the superheating chamber 32 of the superheating portion 30 is disposed on the entire front side if of the fuel evaporator, the entire side is of the fuel evaporator and the rear side ir of the fuel evaporator (the part at the rear side 11r of the evaporation chamber). The heated gas conduit 13 described here has a structure that covers not only the side 11s of the evaporation chamber and the rear side 11r of the evaporation chamber, but also the partition plate 24 of the catalytic combustor 20 and the side 20s of the catalytic combustor.

The operation and action of the fuel evaporator 1 of this embodiment will now be explained. The following numerals (1) to (7) correspond to the numerals (1) to (7) in FIGS. 2 to 4, and indicate the flow of the heated gas HG in the heated gas conduit 13.

(1) Heating of evaporation chamber bottom: The catalytic combustor 20 burns the off gas OG supplied for the fuel cell 5 by catalytic combustion to produce heated gas HG. The catalytic combustion raises the temperature of the catalytic combustor 20, bringing the outer surface of the catalytic combustor 20 to a high temperature (approximately 300° C.). In this fuel evaporator 1, the evaporation chamber bottom surface 11b and the catalytic combustor top surface 20t are in close contact. The evaporation chamber bottom surface 11b (floor of the evaporation chamber 11) is the therefore heated to a high temperature by the catalytic combustor 20. Thus, by effectively utilizing the heat generated by the catalytic combustor 20, formation of liquid pools is prevented and any formed liquid pools are rapidly vaporized.

(2) Flow of raw fuel gas: High temperature heated gas HG at 650–700° C. produced by catalytic combustion of off gas OG from the catalytic combustor 20 (1) is first introduced from the heat medium tubes inlets 12in (2) into the heat medium tubes 12 (3)to heat the evaporation chamber 11, and exits from the heat medium tube outlets 12out. During this time, the heated gas HG vaporizes the raw fuel liquid FL injected from the raw fuel injection apparatus 40. The temperature of the heated gas at the heat medium tube outlets 12out is approximately 350° C.

Next, the heated gas HG enters the heated gas conduit 13 and traveling from the front side 1f of the fuel evaporator (4) through the side 1s of the fuel evaporator (5) and the rear side 1r of the fuel evaporator (6), and reaching the superheating portion 30 (7). During this time, the heated gas HG heats and warms the side 11s of the evaporation chamber and the rear side 11r of the evaporation chamber, while also heating and warming the partition plate 24 of the catalytic combustor 20 and the side 20s of the catalytic combustor. This promotes vaporization of the raw fuel liquid in the fuel chamber 11. It also prevents falling temperature of the heated gas HG flowing from the catalytic combustor outlet 23 to the heat medium tube inlets 12in. The apparatus can also be rapidly warmed up. The temperature of the heated gas at the inlet of the superheating portion 30 is approximately 300° C.

The heated gas HG is discharged from a discharge duct 33 after passing through the superheating portion 30 (superheating chamber 32). During this time, the heated gas HG superheats the raw fuel gas FG to prevent its condensation.

(3) Raw fuel gas flow: The raw fuel liquid FL stored in the raw fuel liquid tank T is compressed and transferred with a pump and injected from the raw fuel injection apparatus 40 into the evaporation chamber 11.

Most of the injected raw fuel liquid FL is immediately vaporized at the surface of the plurality of arranged heat medium tubes 12 in the evaporation chamber 11, and converted into raw fuel gas FG. Incidentally, in cases where the raw fuel liquid FL is suddenly injected, the raw fuel liquid FL that fails to fully vaporize falls downward in the evaporation chamber 11, but while falling it undergoes heat exchange with the already vaporized raw fuel gas FG, rising to a higher temperature (it is partially vaporized). Furthermore, when the unvaporized raw fuel liquid FL drops down onto the heat medium tubes 12 positioned at the lower end, it is heated on the surface of the heat medium tubes 12 and vaporized. The raw liquid fuel FL that has not fully vaporized at the end reaches the evaporation chamber bottom surface 11b, but the evaporation chamber bottom surface 11b is heated by the catalytic combustor 20 to a high temperature, and therefore vaporization occurs without forming liquid pools. Even if liquid pools do form, the evaporation chamber bottom surface 11b continues to be heated so long as the catalytic combustor 20 is accomplishing catalytic combustion, so that the liquid pools are rapidly vaporized into raw fuel gas FG and disappear.

Since the side 11s of the evaporation chamber and the rear side 11r of the evaporation chamber are particularly heated and warmed by the heated gas conduit 13 in the evaporator body 10 (evaporation chamber 11), vaporization of the raw fuel liquid FL is further promoted, thus preventing liquid pools.

In other words, each side of the evaporation chamber in a conventional fuel evaporator is only either warmed by the vaporized raw fuel gas or is warmed by heat conducted from the heat medium tubes and heat medium tube holder plate as the heat source. Consequently, the raw fuel liquid has not easily vaporized when it adheres to the sides of the evaporation chamber, and once the raw fuel gas has vaporized, it has tended to condense in the evaporation chamber (i.e., liquid pools have readily formed).

In this respect, since the fuel evaporator 1 of the present embodiment has a construction such that a plurality of sides of the evaporation chamber 11 are heated and warmed by the heated gas HG and catalytic combustor 20, the formation of liquid pools can be kept to a minimum (i.e., the response of the fuel evaporator is improved). In particular, since the evaporation chamber 11 is rapidly warmed by the heated gas conduit 13 provided in the evaporation chamber 11 when the fuel cell system FCS is started, the apparatus can be rapidly warmed up. That is, the problem whereby vaporized raw fuel gas FG is cooled on the respective sides (walls) of the evaporation chamber 11 and condenses is significantly reduced.

The raw fuel gas FG vaporized in the evaporation chamber 11 enters the superheating portion 30 through ventilation means 14 such as a punching plate having numerous small holes, and is superheated while passing through the vapor tubes 31, and fed to the reformer 2 shown in FIG. 1.

Modified embodiments of each of the constituent elements of the fuel evaporator 1 will now be explained.

(Arrangement of Heat Medium Tubes)

Modifications on the arrangement of the heat medium tubes 12 will now be described. The members and elements in common with the fuel evaporator according to the embodiments of the invention described above will be indicated by the same reference numerals and their explanation will be omitted.

First, the problems to be solved by these modifications will be presented.

Figure 23:
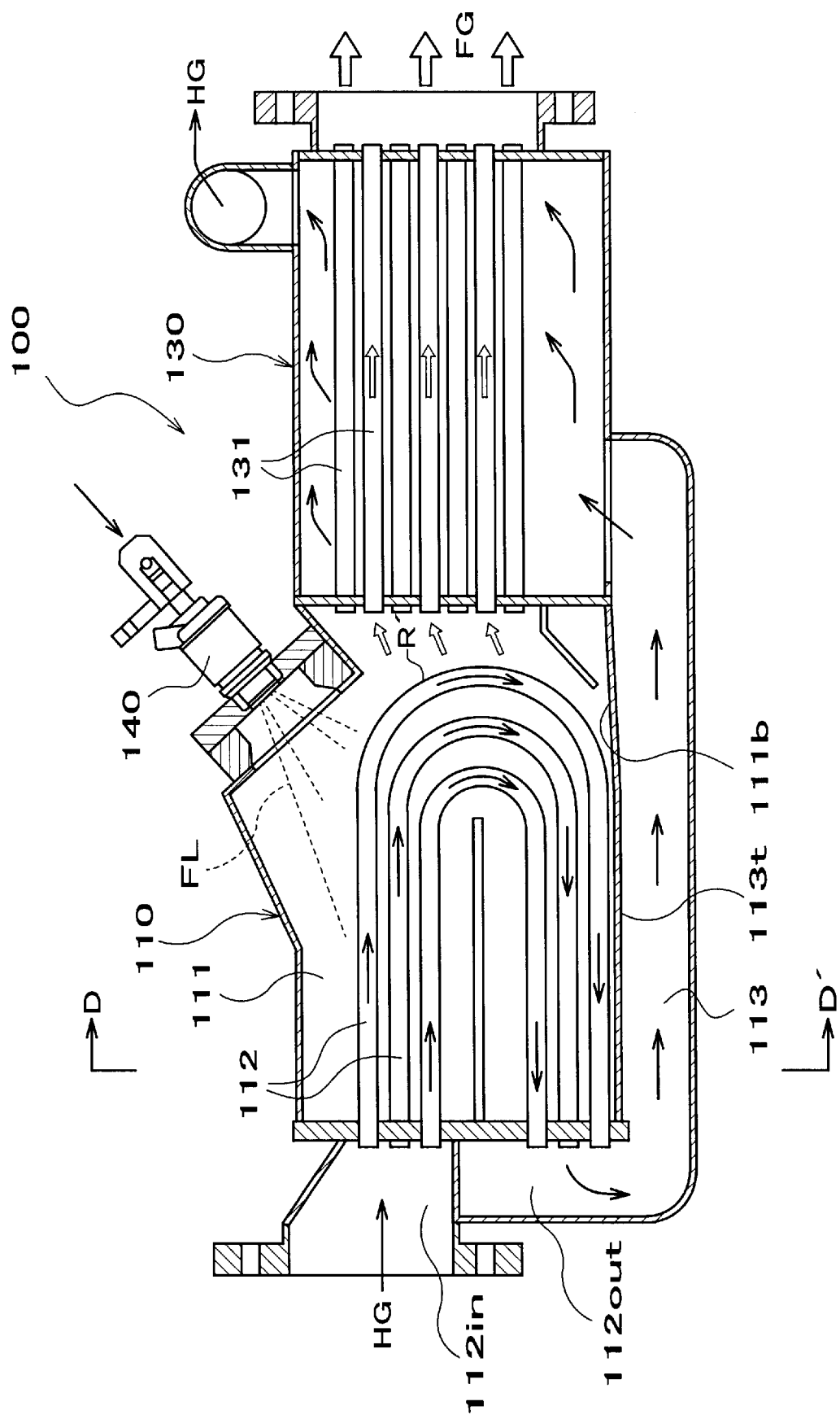
FIG. 23 is a cross-sectional view of a fuel evaporator according to the prior art.
Figure 24:
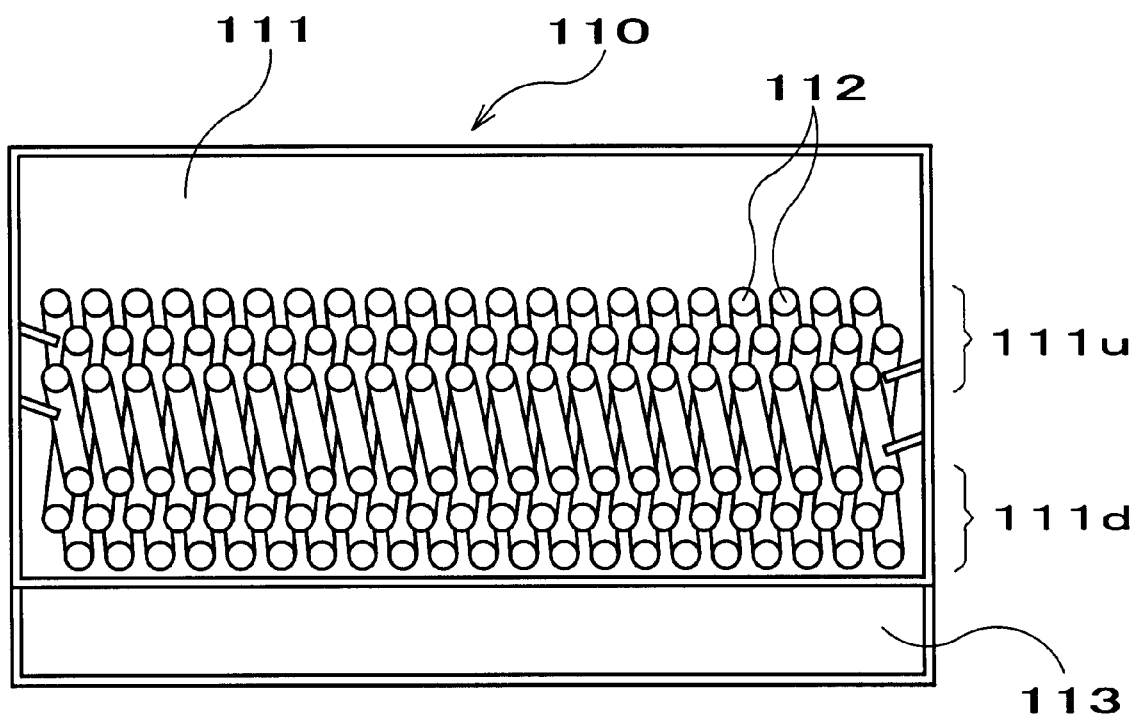
FIG. 24 is a cross-sectional view along line D—D' in FIG. 23.

Specifically, as shown in FIG. 23 and FIG. 24, when the heated gas HG flows through the U-shaped heat medium tubes 112 from the lower potion toward the upper portion of the evaporation chamber 111, any liquid pools that form lower the temperature of the heated gas HG flowing through the heat medium tubes 112 located at the liquid pools. (With the lower temperature, it will now flow through upper portion of the evaporation chamber 111). Consequently, even when raw fuel liquid FL is injected into the heat medium tubes 112 through which the temperature-lowered heated gas HG flows, the injected raw liquid fuel FL cannot be adequately vaporized and thus falls down without being vaporized, tending to increase the liquid pools.

On the other hand, when the heated gas HG passes through the U-shaped heat medium tubes 112 from the upper portion toward the lower portion of the evaporation chamber, as explained above, the temperature of the heated gas HG flowing through the heat medium tubes 112 falls at the sections where the raw fuel liquid FL is injected. Consequently, even when liquid pools have formed at these sections of the heat medium tubes 112 at the bottom portion of the evaporation chamber 111 where the temperature-lowered heated gas HG passes through, the liquid pools formed at these sections are difficult to vaporize.

Figure 12:
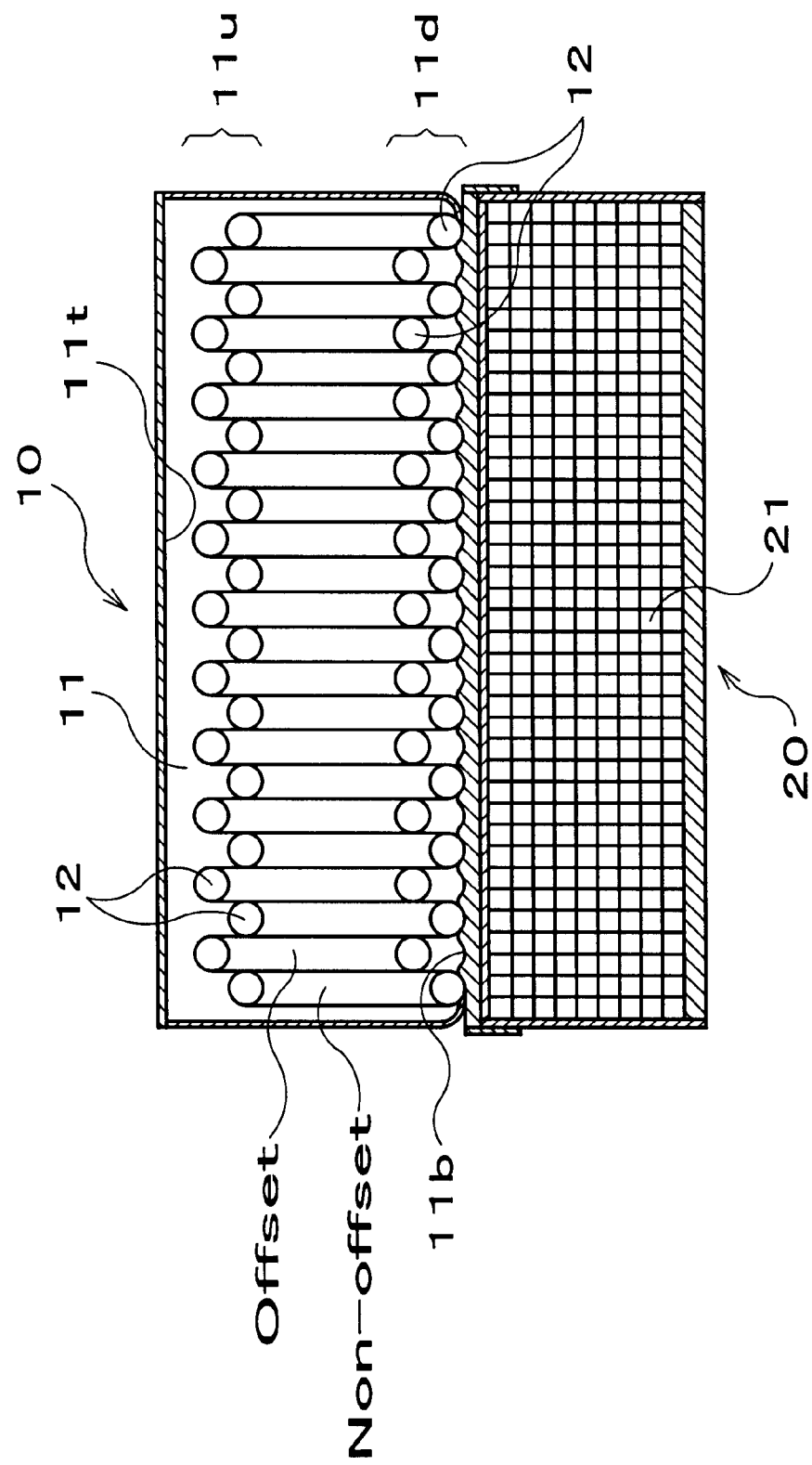
FIG. 12 is a schematic cross-sectional view showing a modified arrangement of heat medium tubes for a fuel evaporator.
Figure 13:
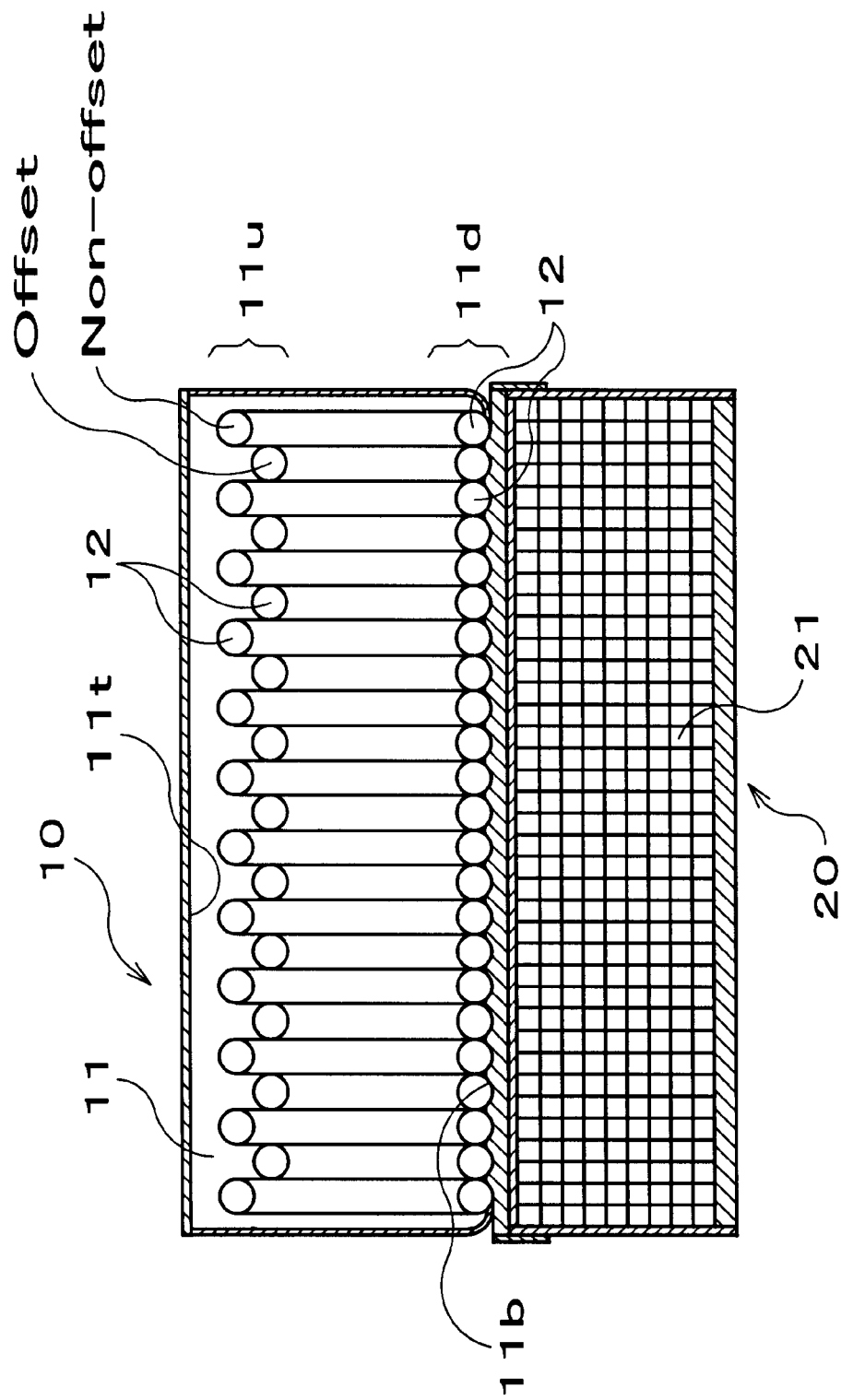
FIG. 13 is a schematic cross-sectional view showing a modified arrangement of heat medium tubes that is different from FIG. 12.

Thus, a modified arrangement of the heat medium tubes has the certain of the plurality of heat medium tubes 12 in the evaporation chamber 11 arranged in an offset manner from the top surface 11u of the evaporation chamber or the evaporation chamber bottom surface 11d depending on the direction of flow of the heated gas HG. Examples of arrangements of heat medium tubes where certain of the heat medium tubes 12 are offset are shown in FIG. 12 and FIG. 13. The raw fuel injection portion 40a is situated on the top surface 11u of the evaporation chamber.

FIG. 12 is a schematic cross-sectional view showing a modified arrangement of heat medium tubes in a fuel evaporator (cross-sectional view from the same perspective as FIG. 4). FIG. 13 is a schematic cross-sectional view showing a modified arrangement of heat medium tubes that is different from that of FIG. 12 (cross-sectional view from the same perspective as FIG. 4).

(1) First, the modified arrangement of heat medium tubes will be explained with reference to FIG. 12. Here, the heat medium tubes 12 are U-shaped tubes.

The heated gas HG in the heat medium tubes 12 flows from the evaporation chamber lower portion lid toward the upper portion 11u of the evaporation chamber. The heat medium tubes 12 at the upper portion 11u of the evaporation chamber are alternately offset from the evaporation chamber bottom surface 11b (separated from the evaporation chamber bottom surface 11b). The offset heat medium tubes 12 at the upper portion 11u of the evaporation chamber are situated closer to the evaporation chamber top surface 11t by the offset distance. The offset heat medium tubes 12 and the non-offset heat medium tubes 12 may also be aligned at the same height at the upper portion 11u of the evaporation chamber.

The raw fuel liquid FL is injected from the evaporation chamber top surface 11t.

In the case of the heat medium tube arrangement shown in FIG. 12, as explained above, certain of the plurality of arranged heat medium tubes 12 (every other one) is offset from the evaporation chamber bottom surface 11b. Thus, even if liquid pools form at the offset sections, the heated gas HG passing through the heat medium tubes 12 can move toward the upper portion 11u of the evaporation chamber with less temperature reduction than if there were no offset (with no heat being lost at the liquid pool sections). Consequently, the offset heat medium tubes 12 are more efficient at vaporizing the injected raw fuel liquid in the upper portion 11u of the evaporation chamber, than if no offset were designed. The injected raw fuel liquid is therefore satisfactorily vaporized at the upper portion 11u of the evaporation chamber, and falling of the raw fuel liquid FL onto the lower portion 11d of the evaporation chamber can be prevented. In other words, increased liquid pool formation can be prevented.

(2) A modified arrangement of heat medium tubes different from that of FIG. 12 will now be explained with reference to FIG. 13. Here as well, the heat medium tubes 12 are U-shaped tubes.

Unlike the heat medium tube arrangement shown in FIG. 12, the heated gas HG flows in the heat medium tubes 12 from the upper portion of the evaporation chamber 11u toward the lower portion 11d of the evaporation chamber. The heat medium tubes 12 at the upper portion 11u of the evaporation chamber are alternately offset from the evaporation chamber top surface 11t(separated from the evaporation chamber top surface 11t). The offset heat medium tubes 12 and the non-offset heat medium tubes 12 are both arranged near the evaporation chamber bottom surface 11b.

The raw fuel liquid FL is injected from the evaporation chamber top surface 11t.

With the heat medium tube arrangement exemplarily shown in FIG. 13, as explained above, certain of the plurality of arranged heat medium tubes 12 (every other one) are offset from the evaporation chamber top surface 11t. Thus, the raw fuel liquid injected from the evaporation chamber top surface 11t tends to contact the non-offset heat medium tubes 12 (it is more readily injected) Consequently, the heated gas HG flowing through the offset heat medium tubes 12 can move toward the lower portion 11d of the evaporation chamber with less temperature reduction than if there were no offset (with no heat being lost by atomization). Consequently, the offset heat medium tubes 12 are more efficient at vaporizing the liquid pools in the lower portion 11d, than if no offset were designed. The liquid pools can therefore be more efficiently vaporized.

Thus, modified heat medium tube arrangements for the fuel evaporator can achieve a balance between temperature reduction of the heated gas due to liquid pools when liquid pools form, and vaporization capability of the raw fuel liquid injected at the upper portion of the evaporation chamber, to thus allow stable vaporization of the raw fuel liquid.

Moreover, a balance can be achieved between the temperature reduction of the raw fuel liquid injected at the upper portion of the evaporation chamber and vaporization capability of liquid pools formed at the lower portion of the evaporation chamber, to allow stable vaporization of the raw fuel liquid.

The resonance point in the evaporation chamber can also be shifted, since certain of the heat medium tubes are offset among the plurality of heat medium tubes, to thereby solve the problem of noise and damage to the machinery by oscillation.

These modifications may be suitably applied for construction of thin-film fuel evaporators.

Incidentally, in this embodiment of the fuel evaporator 1 according to the invention shown in FIG. 3, the heat medium tubes 12 are arranged in a three-layer structure with an outer layer, middle layer and inner layer.

The outer layer of heat medium tubes 12 pass through the lowermost portion (near the evaporation chamber bottom surface 11b), curve up toward the uppermost portion (the evaporation chamber top surface 11t) and are first to contact with the raw fuel liquid FL injected from the raw fuel injection portion 40a. Thus, when liquid pools have formed (at the lowermost portion), the heated gas HG passing through the outer layer of heat medium tubes 12 is cooled by the liquid pools at the lowermost portion and then curve up to the uppermost portion. Consequently, the heat for vaporization of the injected raw fuel liquid is less sufficient than if no liquid pools had been formed.

However, the middle layer and inner layer heat medium tubes 12 are offset from the evaporation chamber bottom surface 11b such that they do not contact the liquid pools. Thus, the heated gas HG flowing through the middle layer and inner layer heat medium tubes 12 curves upward without any significant loss of heat to the liquid pools. Consequently, even if the raw fuel liquid that has not fully vaporized at the uppermost layer heat medium tubes 12 moves downward, the middle layer and inner layer heat medium tubes 12 have sufficient heat and can therefore vaporize it. The fuel evaporator 1 according to this embodiment according to the invention has the heat concentrated at the lower portion 11d of the evaporation chamber.

In other words, the problems arising from the aforementioned modifications are solved by the fuel evaporator of this embodiment according to the invention.

The heat medium tube arrangement is applied to the U-shaped heat medium tubes but may also be applied to straight tubes or S-shaped tubes. It is also possible to arrange the heat medium tubes more densely near the raw fuel injection portion and more sparsely away from it, by giving the tubes near the raw fuel injection portion a smaller diameter or giving the tubes farther from the raw fuel injection portion a larger diameter.

The spacing between the heat medium tubes may be appropriately adjusted either more widely or narrowly so long as the effect of the invention is not hindered. Similarly, the width of the space between the evaporation chamber top surface and the heat medium tubes at the upper portion of the evaporation chamber (the head space) may also be appropriately adjusted either more widely or narrowly so long as the effect of the invention is not hindered. The cross-sectional shape of the heat medium tubes may be semi-circular to increase the surface area of the heat medium tubes, for those arranged at the lower portion of the evaporation chamber.

(Control of Flowing Heated Gas in Heat Medium Tubes)

As a modification of the inside of the heat medium tubes 12 in the evaporation chamber, a fuel evaporator provided with a turbulence generating portion in the heat medium tubes 12 will be explained with reference to FIG. 14 through FIG. 16. The members and elements in common with the fuel evaporator according to the embodiments of the invention described above will be indicated by the same reference numerals and their explanation will be omitted.

FIG. 14(a) is a main portion outline drawing showing a first embodiment of a turbulence generating portion formed in the heat medium tubes 12 provided in the evaporation chamber 11 of the invention.

The turbulence generating portion has a plurality of narrowed sections WP from the outer circumference to the inner circumference, formed by squeezing the heat medium tubes 12 in a ring fashion or disjointed ring fashion at appropriate spacing. By forming the narrowed sections WP in this manner, the heated gas HG, which is the high temperature heat medium in the heat medium tube $12_1$, is disturbed in its flow by the narrowed sections WP as it passes through the heat medium tube $12_1$, so that the flow is converted from a laminar flow to a turbulent flow. As a result, the boundary film heat transfer coefficient on the interior side of the heat medium tube $12_1$, is increased and the temperature distribution in the radial direction of the heat medium tube $12_1$, is more uniform, thus allowing sufficient heat to be provided to the outer surface of the heat medium tube $12_1$, than with a laminar flow, and thereby effectively utilizing the potential heat of the heated gas HG for vaporization of the raw fuel liquid FL.

FIG. 14(b) is a main portion outline drawing showing a second embodiment of a turbulence generating portion formed in the heat medium tubes 12 provided in the evaporation chamber 11 of the invention.

This turbulence generating portion has a plurality of depressions GP from the outer circumference to the inner circumference, formed by repeating a procedure of clamping the heat medium tube $12_2$ nand squashing the tube and then clamping and squashing the heat medium tube $12_2$ again but from a direction of 90° with respect to the squashed surface at a position appropriately distant from the squashed surface.

The heated gas HG, which is the high temperature heat medium in the heat medium tube $12_2$, is disturbed in its flow by the depressions GP as it passes through the heat medium tube $12_2$, so that the flow is converted from a laminar flow to a turbulent flow. As a result, the boundary film heat transfer coefficient on the interior side of the heat medium tube $12_2$ is increased and the temperature distribution in the radial direction of the heat medium tube $12_2$ is more uniform, thus allowing sufficient heat to be provided to the outer surface of the heat medium tube $12_2$ than with a laminar flow, and thereby effectively utilizing the potential heat of the heated gas HG for vaporization of the raw fuel liquid FL.

The heat medium tubes $12_1$, $12_2$ shown in FIG. 14(a) or FIG. 14(b) are preferably situated directly below where the raw fuel liquid FL is injected. This allows the heated gas HG to be maintained and sent up to the upper heat medium tubes 12 where most of the raw fuel liquid FL is injected, while transferring sufficient heat to the outer surface of the heat medium tubes 12, so that the raw fuel liquid FL can be vaporized more immediately than if no turbulence generating portion were provided. The heat medium tubes $12_1$, $12_2$ shown in FIG. 14(a) and FIG. 14(b) may be installed at the heated gas HG inlet 12in side in the heat medium tubes 12 or at the heated gas HG outlet 12out side in the heat medium tubes 12.

Figure 15:
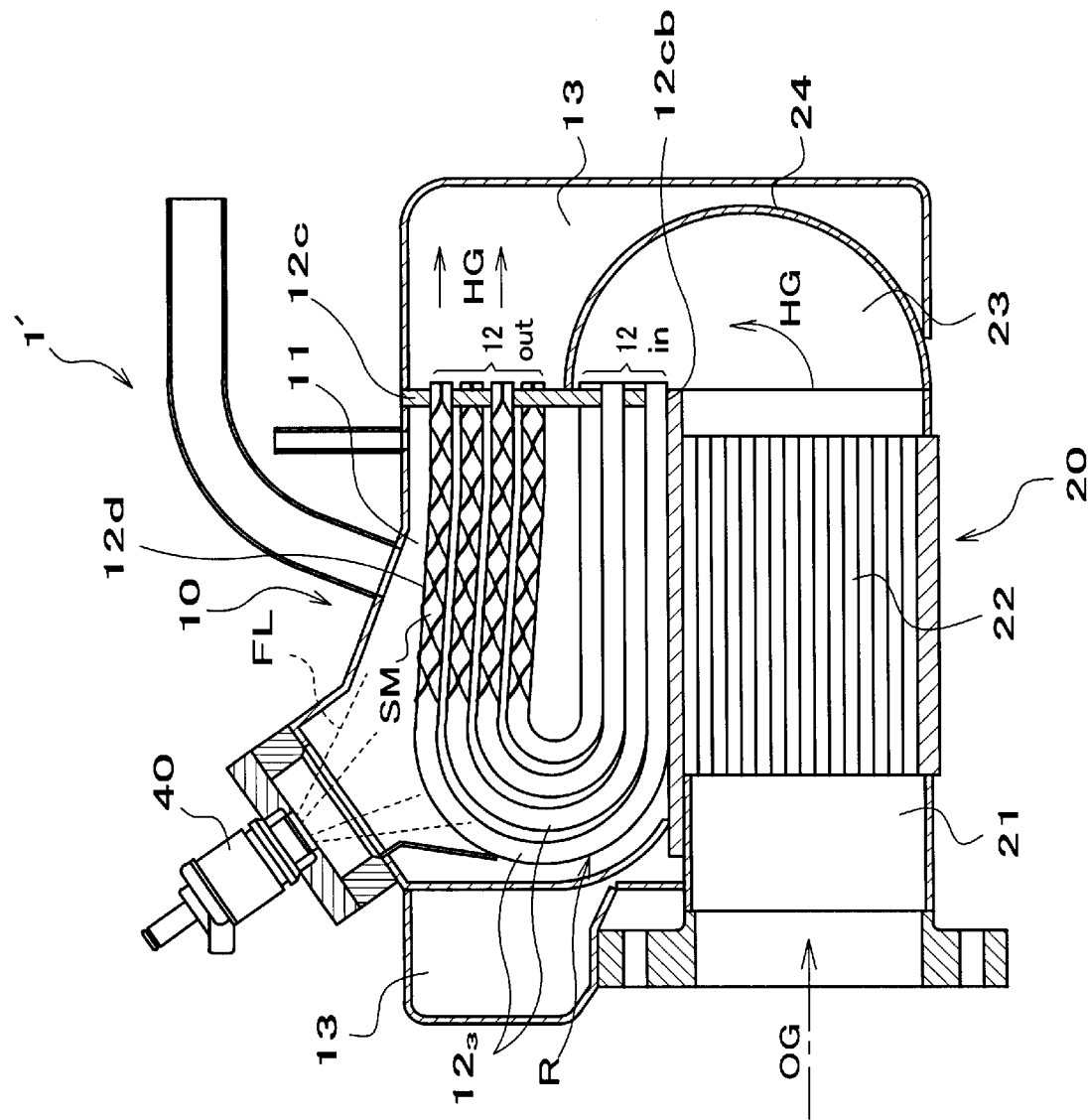
FIG. 15 is a front cross-sectional view of a fuel evaporator according to another embodiment wherein turbulence generators are provided inside heat medium tubes according to the invention.

FIG. 15 shows a fuel evaporator 1' as another embodiment using heat medium tubes $12_3$ provided with a turbulence generating portion having twisted fins SM in the heat medium tubes 12, as shown in FIG. 16.

This fuel evaporator 1' has the same construction as FIG. 3 except for the twisted fins $SM_1$, $SM_2$ which are explained below and therefore the explanation of the fuel evaporator 1' is omitted. The members in FIG. 15 that are the same as FIG. 3 are indicated by the same reference numerals.

Thus, by providing a turbulence generating portion with twisted fins $SM_1$, $SM_2$ in the heat medium tube $12_3$, it is possible to disturb the flow in the heat medium tube $12_3$. As a result, the boundary film heat transfer coefficient on the interior side of the heat medium tube $12_3$ is increased and the temperature distribution in the radial direction of the heat medium tube $12_3$ is more uniform than if no turbulence generating portion were provided. Sufficient heat can therefore be provided to the outer surface of the heat medium tube $12_3$, and the potential heat of the heated gas HG can be more effectively utilized for vaporization of the raw fuel liquid FL.

An embodiment of twisted fins to be used for a turbulence generating portion provided in heat medium tubes 12 according to the invention will now be explained with reference to FIG. 16.

FIG. 16(a) is an outline drawing of a first embodiment of twisted fins for turbulence generation provided in a heat medium tube $12_3$ according to the invention.

Each twisted fin $SM_1$ is a single rectangular strip twisted 360° to the right or to the left, and is formed into a wave with a constant pitch and appropriate length. When the heated gas HG, which is the high temperature heat medium flowing as a laminar flow in the heat medium tube $12_3$, flows to the twisted fin $SM_1$ loaded in the heat medium tube $12_3$, it impacts with the twisted fin $SM_1$ causing the high temperature heated gas HG at the center of the heat medium tube $12_3$ to be agitated from the center toward the inner side of the heat medium tube $12_3$ along the face of the twisted fin $SM_1$, while the gas that has impacted the inner side is returned from the inner side to the center of the heat medium tube $12_3$ to cause a disturbed flow. As a result, the boundary film heat transfer coefficient on the interior side of the heat medium tube $12_3$ is increased and the temperature distribution in the radial direction of the heat medium tube $12_3$ is more uniform, thus allowing sufficient heat to be provided to the outer surface of the heat medium tube $12_3$ than with a laminar flow, and thereby effectively utilizing the potential heat of the heated gas HG for vaporization of the raw fuel liquid FL.

FIG. 16(b) is an outline drawing of a second embodiment of twisted fins for turbulence generation provided in a heat medium tubes 12 according to the invention.

Each twisted fin $SM_2$ is has holes opened at the center sections as viewed from the front of the twisted fins $SM_1$, of the first embodiment. Providing such open holes can result in a more optimum turbulence by promoting a disturbed flow. By opening holes in the twisted fin $SM_2$, it is possible to prevent resonance of the heat medium tube $12_3$ on which the twisted fins $SM_2$ are provided when a large volume of heated gas flows through the heat medium tube $12_3$, thus providing a fuel evaporator 1 with low noise.

The twisted fins $SM_1$, $SM_2$ shown in FIG. 16(a) and FIG. 16(b) are preferably situated directly below where the raw fuel liquid FL is injected. This allows the high temperature heated gas HG to be maintained and sent up to the upper heat medium tubes $12_3$ where most of the raw fuel liquid FL is injected, while transferring sufficient heat to the outer surface of the heat medium tubes $12_3$, so that the raw fuel liquid FL can be vaporized more immediately than if no twisted fin $SM_1$ (or $SM_2$) were provided. The twisted fins $SM_1$, $SM_2$ shown in FIG. 16(a) and FIG. 16(b) may be loaded at the heated gas HG inlet 12in side in the heat medium tubes $12_3$ or at the heated gas HG outlet 12out side in the heat medium tubes $12_3$.

By loading twisted fins $SM_1$, $SM_2$ of FIG. 16(a) or FIG. 16(b) in heat medium tubes $12^1$, $12_2$ having the shapes shown in FIG. 14(a) and FIG. 14(b), it is possible to promote flow disturbance by a synergistic effect and to supply a sufficient amount of heat more rapidly to the outer surfaces of the heat medium tubes $12_1$, $12_2$.

A third embodiment of twisted fins, which is not shown, may employ twisted fins with an element of a rectangular strip twisted 180° in the right direction and an element twisted 180° in the left direction, with the edges thereof crossing at 90° in the axial direction; this inverts the gas flow at each element, thus further promoting the disturbed flow and allowing sufficient heat to be supplied more rapidly to the outer surface of the heat medium tubes 12.

A method of affixing the twisted fins $SM_1$, $SM_2$ in the heat medium tubes 12 will now be explained.

The method of affixing a twisted fin in the heat medium tube $12_3$ may be one wherein the twisted fin $SM_1$ (or $SM_2$) is inserted into the heat medium tube $12_3$ and the heat medium tube $12_3$ is partially squashed from the outside to contact the squashed side with the twisted fin $SM_1$ (or $SM_2$) for attachment, or one wherein the twisted fin $SM_1$ (or $SM_2$) is inserted into the heat medium tube $12_3$ and then spot welded for attachment.

By the construction and action described above, the raw fuel liquid FL that has satisfactorily vaporized in the evaporation chamber 11 is converted to raw fuel gas FG and introduced into the reformer 2. Also, the heated gas HG that has vaporized the raw fuel liquid FL passes through the heated gas conduit 13 provided around the evaporation chamber 11, and is introduced to the superheating portion 30 to superheat the raw fuel gas FG vaporized at the evaporation chamber 11.

As explained above, a turbulence generating portion is provided on either or both the outer side and/or inner side of the heat medium tubes 12 to provide a fuel evaporator equipped with a tubing structure in the evaporation chamber 11 that can accomplish rapid vaporization of raw fuel liquid FL injected into the evaporation chamber 11 and that can effectively utilize the potential heat of the heated gas HG for vaporization of the raw fuel liquid FL.

(Evaporation Chamber Bottom Surface Shape)

Modifications to construction of the top surface 20t of the catalytic combustor 20 on the evaporation chamber bottom surface 11b of the evaporator 11 will now be explained.

Figure 17:
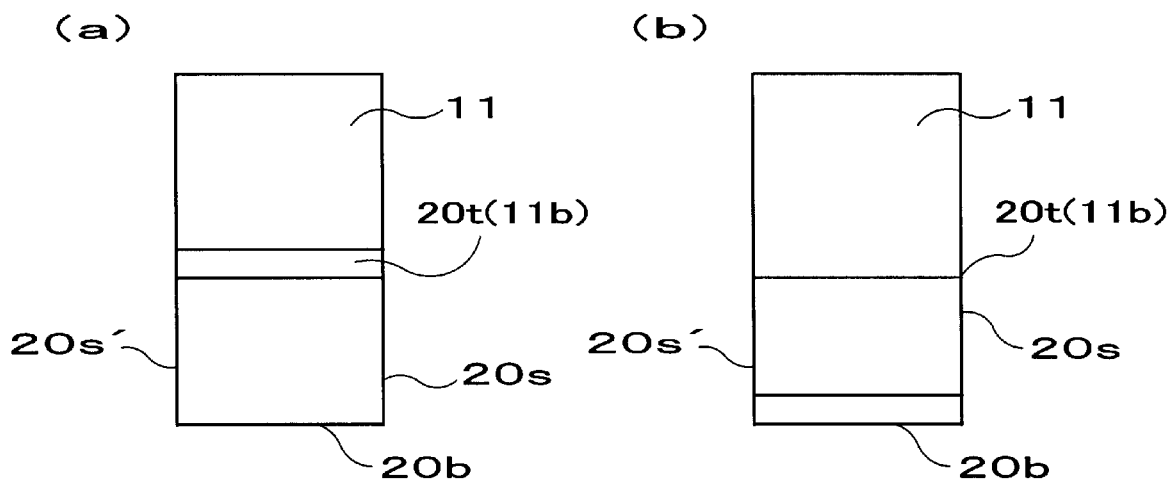
FIGS. 17($a$) and ($b$) are each cross-sectional views along line B—B' in FIG. 2, showing other embodiments of the invention.

If the top surface 20t of the catalytic combustor 20 is made thicker than the other surrounding sections 20b, 20s and 20s ' as shown in FIG. 17(a), a heat mass is provided above the thickened catalytic combustor 20, so that the transition response is improved and the stored raw fuel liquid can be vaporized even after catalytic combustion.

Conversely, as shown in FIG. 17(b), the bottom 20b of the catalytic combustor may be made thicker than the other surrounding sections 20t, 20s'. With this construction, a heat mass accumulates below the catalytic combustor 20, thus improving heat transfer efficiency with the evaporation chamber 11 and increasing the radiation area, so that the catalytic combustor 20 can function rapidly in response to sudden demands for vaporized raw fuel, and the fuel evaporator 1 can be warmed up and started to yield raw fuel gas FG.

Figure 18:
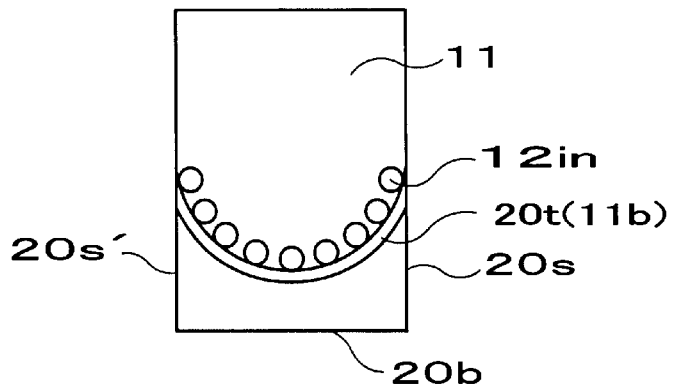
FIG. 18 is a cross-sectional view along line B—B' in FIG. 2, showing yet another embodiment of the invention.

In addition, the top surface 20t of the catalytic combustor 20 may have a depressed shape from the periphery toward the center as shown in FIG. 18, or preferably, it is formed so that the cross-section of the catalytic combustor 20 forms a roughly semi-circular inverted arch. By situating the lowermost portion of the evaporation chamber 11 where liquid pools are most likely to be formed, near the center of the catalytic combustor 20 where the amount of heat is greatest, the greater heat near the center of the catalytic combustor 20 compared to its outer periphery allows more of the liquid pools to be vaporized, so that vaporization can be rapidly accomplished utilizing the heat with minimal waste. In addition, by forming the cross-section of the catalytic combustor 20 as a roughly semi-circular inverted arch, the surface area other than the top plate 20t is reduced, so that an effect of lower heat loss is also exhibited.

In the fuel evaporator 1 of the invention, the catalytic combustor 20 provided adjacent to or in close contact with the evaporation chamber 11 may be mounted in a detachable manner. In this case, the entire catalytic combustor 20 may be mounted in a detachable manner, but it will commonly be only the catalyst layer 22 portion that is detachable. With this construction, the catalytic combustor 20 may be detached for inspection or replacement of the catalytic combustor 20, and particularly the catalyst layer 22 which requires frequent inspection and replacement, so that inspection is facilitated and costs can be reduced through replaceable parts. Furthermore, a thin member with a high heat transfer efficiency may be held between the catalytic combustor 20 and the evaporation chamber 11. This can help avoid warping due to heat stress caused by the temperature difference of the catalytic combustor 20 and the evaporation chamber 11, to thereby enhance the strength against vibrations.

(Structure to Prevent Raw Fuel Liquid Escape)

A modified structure to prevent raw fuel liquid escape will now be explained with reference to FIG. 19 and FIG. 20. Since only the raw fuel liquid escape-preventing structure differs from that of the fuel evaporator 1 illustrated in the drawing, the corresponding members will be indicated by the same reference numerals and their explanation will be omitted.

Figure 19:
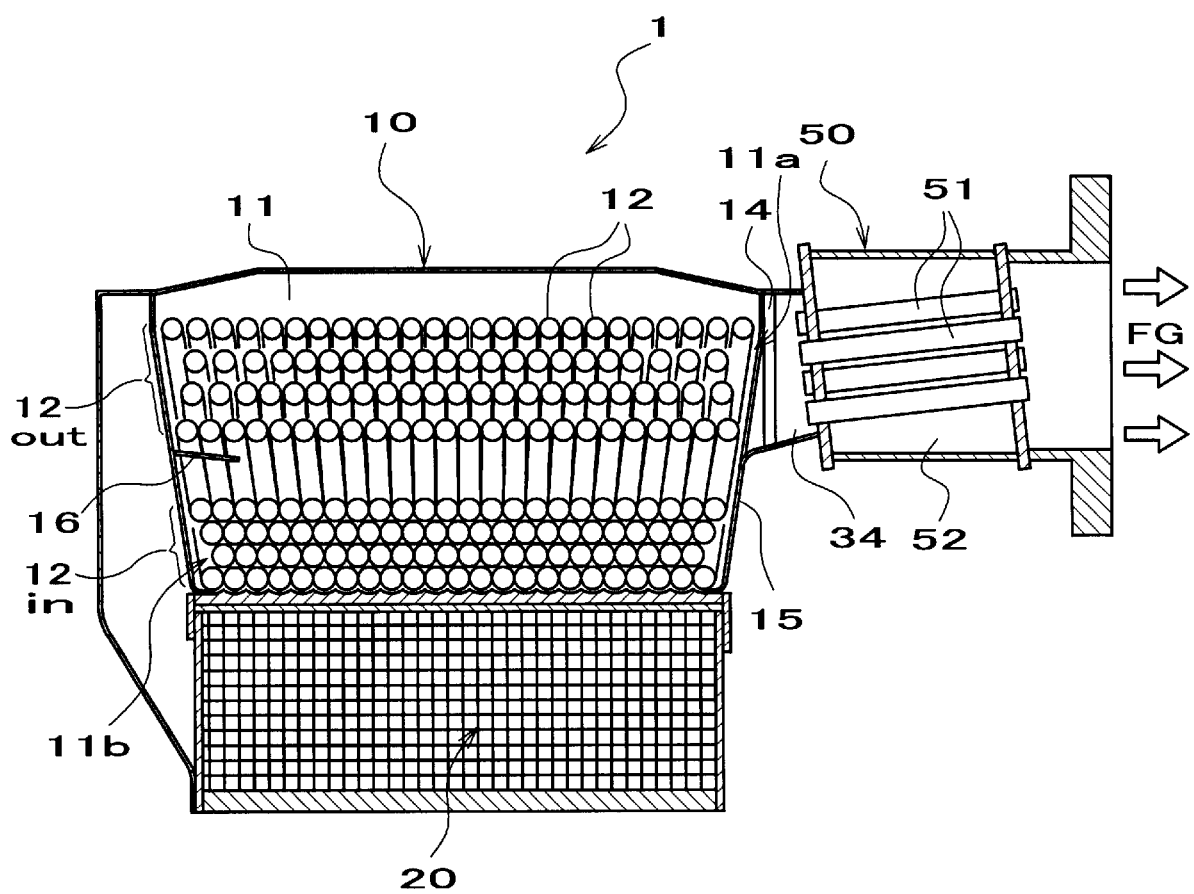
FIG. 19 is a front cross-sectional view of a second embodiment of a fuel evaporator according to the invention.
Figure 20:
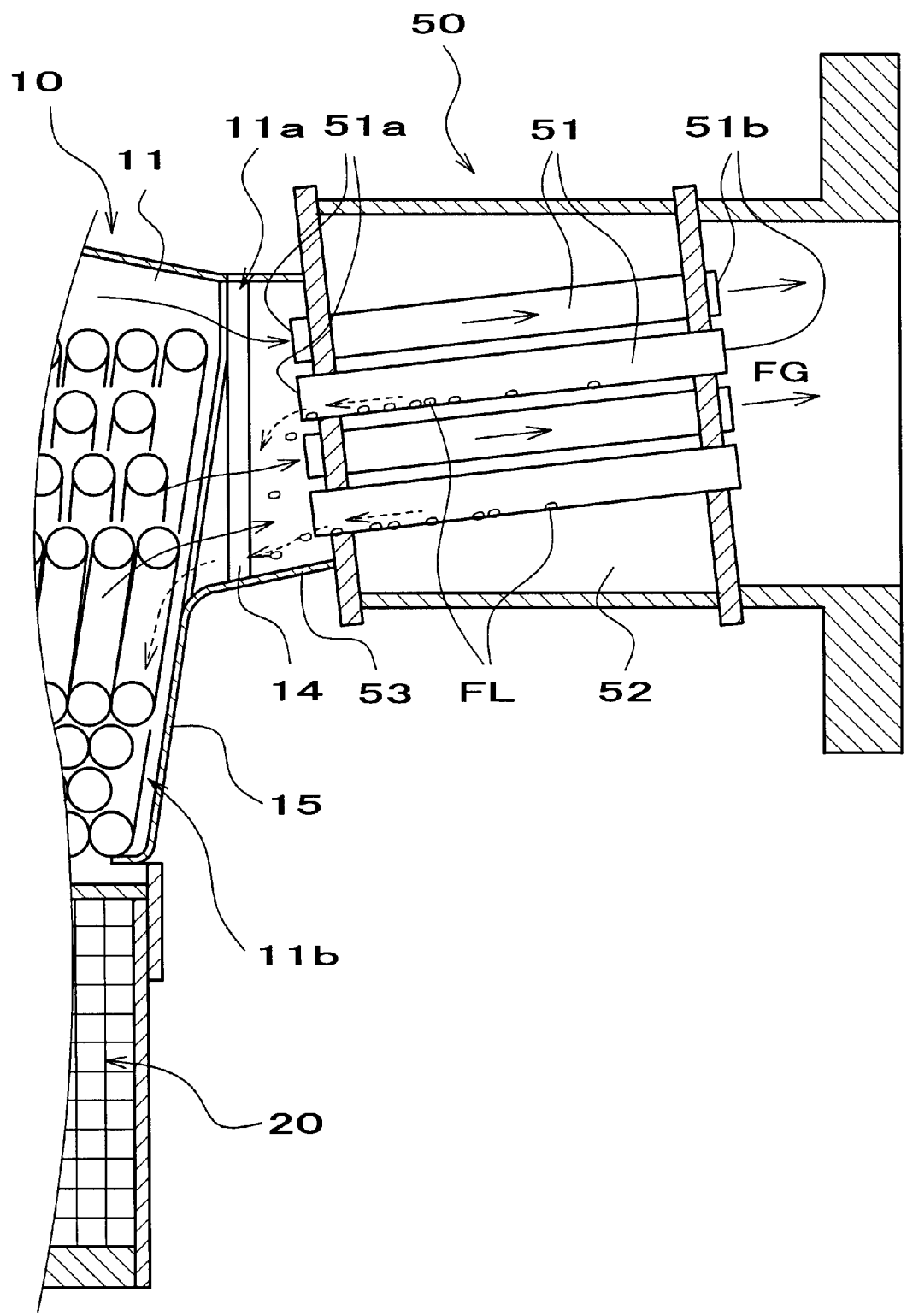
FIG. 20 is a front cross-sectional view showing a structure preventing flow out of raw fuel liquid in a second embodiment of a fuel evaporator according to the invention.

As shown in FIG. 19 and FIG. 20, the structure to prevent raw fuel liquid escape in the evaporator body 10 according to this embodiment has the lower ends 51a of the vapor tubes 51 in the superheating portion 50 at the evaporation chamber outlet 11a formed in the evaporator body 10, situated above the lower end of the evaporator outlet 11a. This is identical to the first embodiment in the aspect of the inclined vapor tubes 51 and the placement of the vapor tubes 51 in the superheating chamber 52. The lower end 53 of the connection portion connecting the evaporator outlet 11a with the superheating portion 50 is also approximately flush with the lower end of the evaporator outlet 11a.

With this type of construction, the inclination of the vapor tubes 51 allows flow from the raw fuel gas inlet 51a when the raw fuel liquid FL has entered the vapor tubes 51. According to this embodiment, all of the raw fuel liquid FL that has entered the vapor tubes 51 is directly recirculated to the evaporator outlet 11a. It is again vaporized at the evaporation chamber 11 into raw fuel gas FG.

In each of the embodiments explained above, the vapor tubes installed in the superheating portion are mounted at an inclination so that the raw fuel gas inlets are lower than the raw fuel gas outlets. Another possible structure is exemplified by the vapor tubes 61 in the superheating portion 60 shown in FIG. 21(a), which has approximately horizontal tubes in a two-tiered structure such that the raw fuel gas inlets 61a are lower and the raw fuel gas outlets 61b are higher. The raw fuel gas inlets 61a may be designed lower than the raw fuel gas outlets 61b in this manner so that the raw fuel liquid does not run out from the raw fuel gas outlets 61b.

Figure 21:
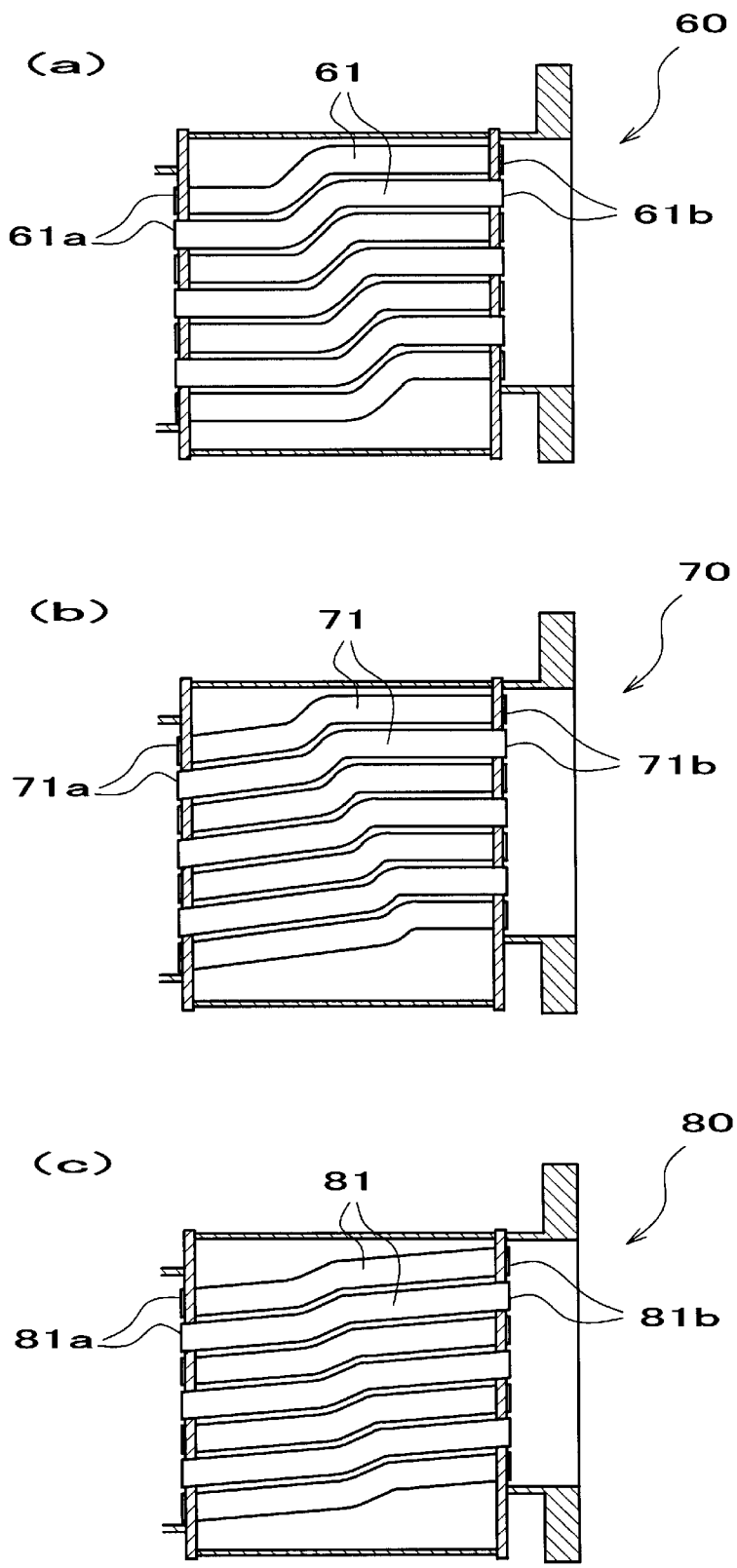
FIGS. 21($a$) to ($c$) are side cross-sectional views showing another embodiment of a superheater.

Another mode is that illustrated by the superheating portion 70 shown in FIG. 21(b), where the vapor tubes 71 are in a two-tiered structure, where only the raw fuel gas inlet 71a ends are inclined. In another possible alternative mode, as the vapor tubes 81 in the superheating portion 80 shown in FIG. 21(c), the vapor tubes 81 are in a two-tiered structure where either or both the raw fuel gas inlets 81a and raw fuel gas outlet 81b ends are inclined. Here, the inclination of the vapor tubes 71, 81 is preferably such that all of the raw fuel gas inlet 71a, 81a ends are lower.

Although a metal mesh was used as the ventilation means provided in the evaporator outlets 11a according to the invention, a punching plate 91 such as shown in FIG. 22(a) or a louver 92 as shown in FIG. 22(b) may also be used. The use of a louver 92 is particularly suitable as it allows splashed or adhered droplets to fall down toward the raw fuel liquid reservoir 11b by the angle of the inclined plate running along each opening.

Figure 22:
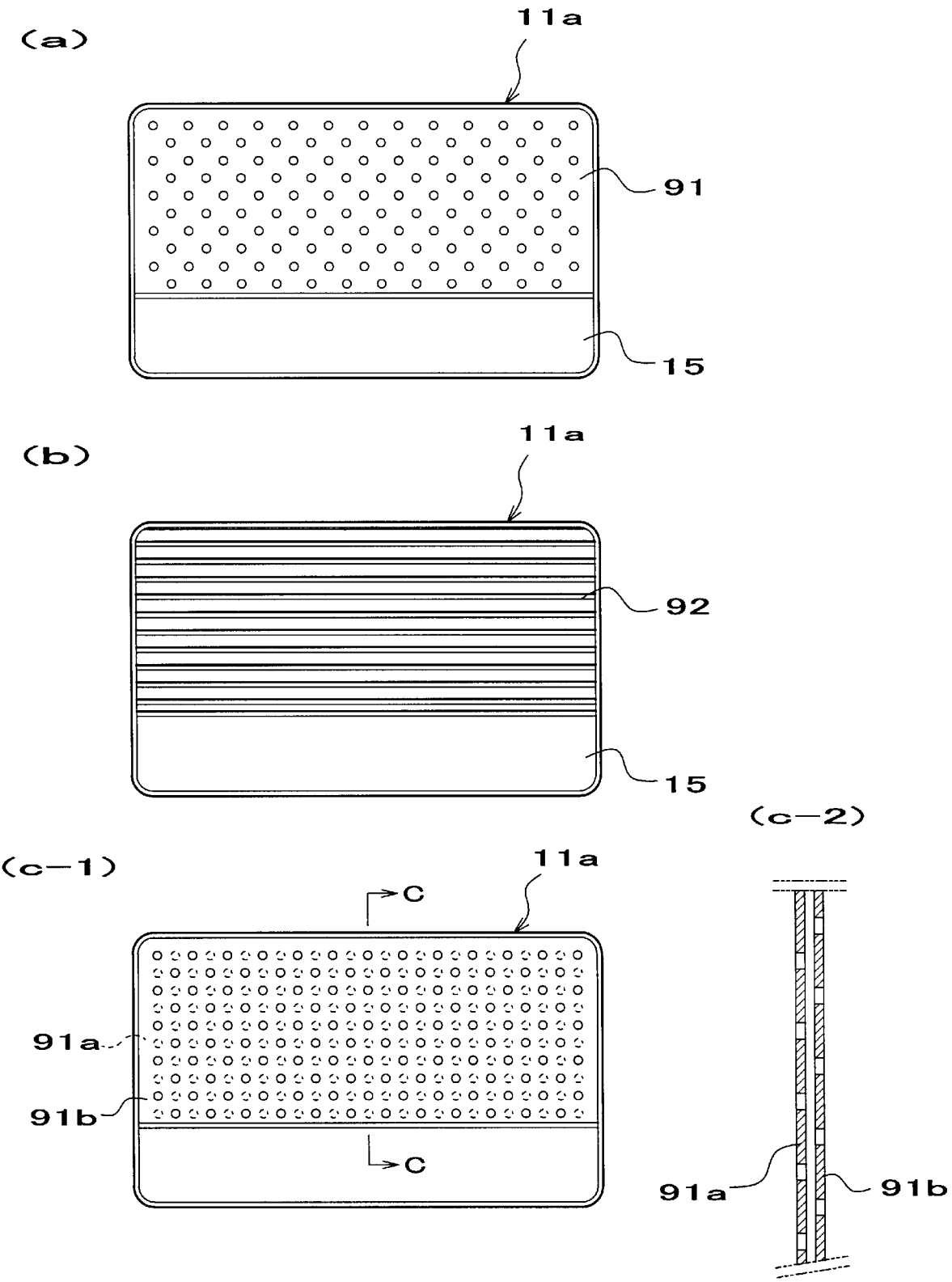
FIGS. 22($a$), ($b$) and (c-1) are side views of ventilation means in a fuel evaporator according to the invention, and (c-2) is a cross-sectional view along line C—C in (c-1).

Also, as shown in FIGS. 22(c-1) and (c-2), two punching plates 91a, 91b may be combined as the ventilation means. Here, the configuration is preferably such that the ventilation holes formed in the punching plate 91a at the front are shifted with respect to the ventilation holes formed in the punching plate 91b at the back, as viewed from the side. By shifting the ventilation holes formed in the punching plate 91a at the front with respect to the ventilation holes formed in the punching plate 91b at the back as viewed from the side, the ventilation holes of the punching plate 91b at the back will greatly reduce the percentage of permeating raw fuel liquid when raw fuel liquid has permeated the ventilation holes of the punching plate 91a at the front. It is thereby possible to reliably prevent outflow of raw fuel liquid FL to the superheating portion 30.

Various modifications may be made to the present invention as explained above within a wide scope that is not limited to the embodiments described above.

For example, the catalytic combustor may be replaced with a combustion burner or electric heater. Alternatively, the heated gas may be subjected to heat exchanged with air or the like to obtain high temperature gas, and this may then be fed to the evaporation chamber or superheating portion instead of the heated gas. The fuel cell may also be a phosphoric acid fuel cell (PAFC), and is not limited to a solid polymer type.

In addition, the heat medium tube length, diameter, thickness, cross-sectional shape and material (ceramic, etc.) may be appropriately selected for the purpose of reducing resonance, within a range that does not hamper the effect of the invention. Incidentally, since fuel cell-powered electric automobiles are quieter than gasoline engine-powered automobiles, noise reduction measures can be considered from a different viewpoint than considered in the prior art.

Thus, the fuel evaporator of the invention that is provided with a catalytic combustor adjacent to the evaporation chamber can supply more heat more rapidly to liquid fuel adhering as droplets to the walls of the evaporation chamber and liquid pools in the evaporation chamber, thus facilitating vaporization of these droplets and liquid pools. A more compact design is also made possible, since there is no need to connect the catalytic combustor and evaporator body with tubes.

Provision of the catalytic combustor in close contact with the evaporation chamber increases the heat transfer effect.

Furthermore, if the contact side of the catalytic combustor that is in close contact with the evaporation chamber forms the bottom of the evaporation chamber, and the bottom is provided with a shape that runs along the outer shape of the heat medium tube arranged closest to the bottom of the evaporator among the heat medium tubes in evaporation chamber through which the high temperature medium passes, then it is possible to reduce the liquid pool space under the evaporation chamber and thereby reduce the amount of liquid pools to allow more rapid liquid vaporization.

Moreover, efficient vaporization of raw fuel liquid can be carried out by heat balance between the section close to the raw fuel injection portion and the section distant from the raw fuel injector, in the evaporation chamber. By creating a wide spacing from top to bottom (vertical direction) and/or from side to side (horizontal direction) for the heat medium tubes near the raw fuel injector, even if filmboiling occurs the filmboiling section cannot easily grow very large. It is therefore possible to evenly spread the raw fuel liquid injected into the evaporation chamber. Thus, since it is possible to widely and efficiently use the heat transfer side of the heat medium tubes, the raw fuel liquid can be satisfactorily vaporized.

In addition, providing inclined sections for at least part of the heat medium tubes for inclination toward the tube holder portion not only prevents droplets of the raw fuel liquid injected on the outer surface of the heat medium tubes from growing large as the move horizontally along the horizontal tubes, but since the temperature increases at the heat receiving tube holder portion that is provided almost directly above the catalyst layer outlet of the catalytic combustor and is heated, the droplets that have accumulated from across the inclined section of the heat medium tubes to the tube holder portion fall down onto the evaporation chamber bottom while being heated at the high temperature tube holder, thus allowing more rapid vaporization.

Moreover, even when unvaporized raw fuel liquid has pooled in the evaporation chamber, it is possible to keep the pooled raw fuel liquid from flowing out to the superheating chamber. It is also possible to keep the unvaporized raw fuel liquid from flowing through the evaporation chamber into the reformer.

In addition, since the heat generated by the catalytic combustor is transferred to the adjacently provided evaporation chamber by conduction or radiation, vaporization of the raw fuel liquid in the evaporation chamber is promoted. It is therefore possible to prevent formation of liquid pools in the evaporator and to rapidly vaporize liquid pools that have been formed. The response of the fuel evaporator is also vastly improved, and the evaporator can be warmed up more rapidly.

What is claimed is:

1. A fuel evaporator for a fuel cell system with an evaporation chamber that vaporizes raw fuel liquid with a heat medium,
   said fuel evaporator comprising a catalytic combustor installed adjacent to said evaporation chamber; wherein a top surface of the catalytic combustor is directly attached to the bottom surface of the evaporator.

2. A fuel evaporator for a fuel cell system according to claim 1, wherein said catalytic combustor generates the heat medium by catalytic combustion, and wherein said catalytic combustor is formed so that the heat is transferred from the catalytic combustor to said evaporation chamber through a plate.

3. A fuel evaporator for a fuel cell system according to claim 2, wherein the contact side of said catalytic combustor is in contact with said evaporation chamber and forms the bottom of said evaporation chamber, and said bottom of said evaporation chamber has a shape that corresponds to the outer shape of a heat medium tube located nearest said bottom among a plurality of heat medium tubes in said evaporation chamber through which said medium flows.

4. A fuel evaporator for a fuel cell system according to claim 3, wherein said bottom of said evaporation chamber has a shape that is depressed from the periphery toward the center.

5. A fuel evaporator for a fuel cell system according to claim 1, which further has a heat medium conduit through which said heat medium flows after said raw fuel liquid has been vaporized, where said heat medium conduit is installed at a location of said evaporation chamber other than the location adjacent to said catalytic combustor.

6. A fuel cell system provided with a fuel evaporator having an evaporation chamber that vaporizes raw fuel liquid with a high temperature heat medium and an adjacent catalytic combustor that supplies said high temperature heat medium thereto, while also comprising a reformer that reforms raw fuel gas formed by vaporization of said raw fuel liquid into raw fuel gas, a fuel cell, and a raw fuel liquid tank that supplies said raw fuel liquid to said fuel evaporator.

7. A fuel cell system according to claim 6, wherein said fuel evaporator is provided with a plurality of heat medium tubes through which said high temperature heat medium passes and a raw fuel injection portion that injects said raw fuel liquid into said heat medium tubes, wherein said heat medium tubes are situated in such a manner that those nearer the raw fuel injection portion are sparse and those further are dense.

8. A fuel evaporator for a fuel cell system provided with an evaporation chamber which vaporizes raw fuel liquid by heat received from a plurality of heat medium tubes through which a heat medium flows to produce raw fuel gas,
   said fuel evaporator comprising a raw fuel injection portion that injects said raw fuel liquid into said heat medium tubes provided in said evaporation chamber, and
   said heat medium tubes are arranged sparsely toward an upper part of the evaporation chamber and densely toward a lower part of the evaporation chamber.

9. A fuel evaporator for a fuel cell system according to claim 8, wherein said evaporation chamber is provided with a tube holder portion that holds a portion of the heat medium tubes which are adjacent to the catalytic combustor and through which said heat medium flows, and said evaporation chamber is provided with a section heated from said catalytic combustor,
   wherein, a portion of the heat medium tubes are slanted downward from horizontal, and the tube holder portion has a section slanted downward from horizontal for holding said slanted portion of said heat medium tubes.

10. A fuel evaporator according to claim 8, wherein said heat medium tubes are provided with a turbulence generating portion that disturbs the flow of said high temperature heat medium.

11. A fuel evaporator for a fuel cell system with an evaporation chamber which vaporizes raw fuel liquid into raw fuel gas with a heat medium,
   said fuel evaporator comprising a catalytic combustor installed adjacent to said evaporation chamber; wherein a top surface of the catalytic combustor is directly attached to the bottom surface of the evaporator
   the fuel evaporator further comprising an evaporation chamber outlet that allows said raw fuel gas to flow out of said evaporation chamber formed in said evaporation chamber, and
   a raw fuel liquid shield, separate from said evaporation chamber, that prevents flow of said raw fuel liquid provided under said evaporation chamber outlet.

12. A fuel evaporator for a fuel cell system according to claim 11, wherein a raw fuel liquid storage section which stores said raw fuel liquid that has pooled under said evaporation chamber is formed in said evaporation chamber, and
   said raw fuel liquid shield extends from a lower end of said evaporation chamber outlet to at least a point above said fuel storage section.

13. A fuel evaporator according to claim 11, wherein ventilation means that prevents passage of liquid droplets of said raw fuel liquid while discharging said raw fuel gas is formed in said evaporation chamber outlet.

14. A fuel evaporator according to claim 12, wherein ventilation means that prevents passage of liquid droplets of said raw fuel liquid while discharging said raw fuel gas is formed in said evaporation chamber outlet.

15. A fuel evaporator for a fuel cell system according to claim 11, wherein said evaporation chamber outlet conducts to a superheating portion which superheats raw fuel liquid that has been vaporized in said evaporation chamber by said heat medium that has passed through a heat medium conduit that conducts said heat medium that has vaporized said raw fuel liquid, vapor tubes that conduct raw fuel gas that has been discharged from said evaporation chamber outlet are installed in said superheater, and a raw fuel gas inlet for the vapor tubes is situated at a location lower than the raw fuel gas outlet.

16. A fuel evaporator for a fuel cell system according to claim 12, wherein said evaporation chamber outlet conducts to a superheating portion which superheats raw fuel liquid that has been vaporized in said evaporation chamber by said heat medium that has passed through a heat medium conduit that conducts said heat medium that has vaporized said raw fuel liquid, vapor tubes that conduct raw fuel gas that has been discharged from said evaporation chamber outlet are installed in said superheater, and a raw fuel gas inlet for the vapor tubes is situated at a location lower than the raw fuel gas outlet.

17. A fuel evaporator for a fuel cell system according to claim 13, wherein said evaporation chamber outlet conducts to a superheating portion which superheats raw fuel liquid that has been vaporized in said evaporation chamber by said heat medium that has passed through a heat medium conduit that conducts said heat medium that has vaporized said raw fuel liquid, vapor tubes that conduct raw fuel gas that has been discharged from said evaporation chamber outlet are installed in said superheater, and a raw fuel gas inlet for the vapor tubes is situated at a location lower than the raw fuel gas outlet.

18. A fuel evaporator for a fuel cell system according to claim 14, wherein said evaporation chamber outlet conducts to a superheating portion which superheats raw fuel liquid that has been vaporized in said evaporation chamber by said heat medium that has passed through a heat medium conduit that conducts said heat medium that has vaporized said raw fuel liquid, vapor tubes that conduct raw fuel gas that has been discharged from said evaporation chamber outlet are installed in said superheater, and a raw fuel gas inlet for the vapor tubes is situated at a location lower than the raw fuel gas outlet.

* * * * *